United States Patent [19]

Kitano

[11] Patent Number: 5,050,094
[45] Date of Patent: Sep. 17, 1991

[54] COMPENSATING METHOD AND DEVICE FOR INSTRUMENTAL ERROR IN ROTARY DISPLACEMENT FLOWMETER

[76] Inventor: Akitoshi Kitano, 38-3, Aza Inokute, Oaza Nagakute, Nagakute-cho, Aichi-gun, Aichi-ken, Japan

[21] Appl. No.: 292,899

[22] Filed: Jan. 3, 1989

[30] Foreign Application Priority Data

Jan. 26, 1988 [JP] Japan .................................. 63-15157

[51] Int. Cl.⁵ .............................................. G01F 25/00
[52] U.S. Cl. .................................. 364/510; 73/861.03; 364/571.03
[58] Field of Search ........... 73/861.01, 861.02, 861.03, 73/861.32, 861.33, 861.34; 235/94 R, 94 A; 364/465, 509, 510, 571.02, 571.03, 571.04; 377/21

[56] References Cited

U.S. PATENT DOCUMENTS

| | | | |
|---|---|---|---|
| 3,895,529 | 7/1975 | Moore | 73/861.03 |
| 3,945,253 | 3/1976 | Liu et al. | 73/861.02 |
| 4,173,891 | 11/1979 | Johnson | 364/510 X |
| 4,303,983 | 12/1981 | Chaborski | 364/571.02 X |
| 4,390,956 | 6/1983 | Cornforth et al. | 73/861.03 X |
| 4,619,146 | 10/1986 | Teodorescu et al. | 73/861.54 |
| 4,720,800 | 1/1988 | Suzuki et al. | 73/861.03 X |
| 4,722,232 | 2/1988 | Grob | 73/861.72 |
| 4,829,449 | 5/1989 | Polesnak | 73/861.03 X |
| 4,881,412 | 11/1989 | Northedge | 364/510 X |

*Primary Examiner*—Parshotam S. Lall
*Assistant Examiner*—Edward R. Cosimano
*Attorney, Agent, or Firm*—Fleit, Jacobson, Cohn, Price, Holman & Stern

[57] ABSTRACT

An instrumental error compensating device has super precision measurement functions, even in a condition having only microtemperature changes, by utilizing a computer which compensates for flowrate errors instantaneously and sends signals for indicating corrected values. Flowmeter (1) of the type having elliptical gears (4,4') has temperature sensor (5) mounted thereon and a rotation sensor (6, 71) for indicating temperature and rotational speed. The signals from the sensors are fed to a micro computer (100). The errors can be caused by wear temperature changes, and viscosity changer, for example, and are compensated for by the computer based on flow rate and temperature of the fluid detected by the sensors.

4 Claims, 28 Drawing Sheets

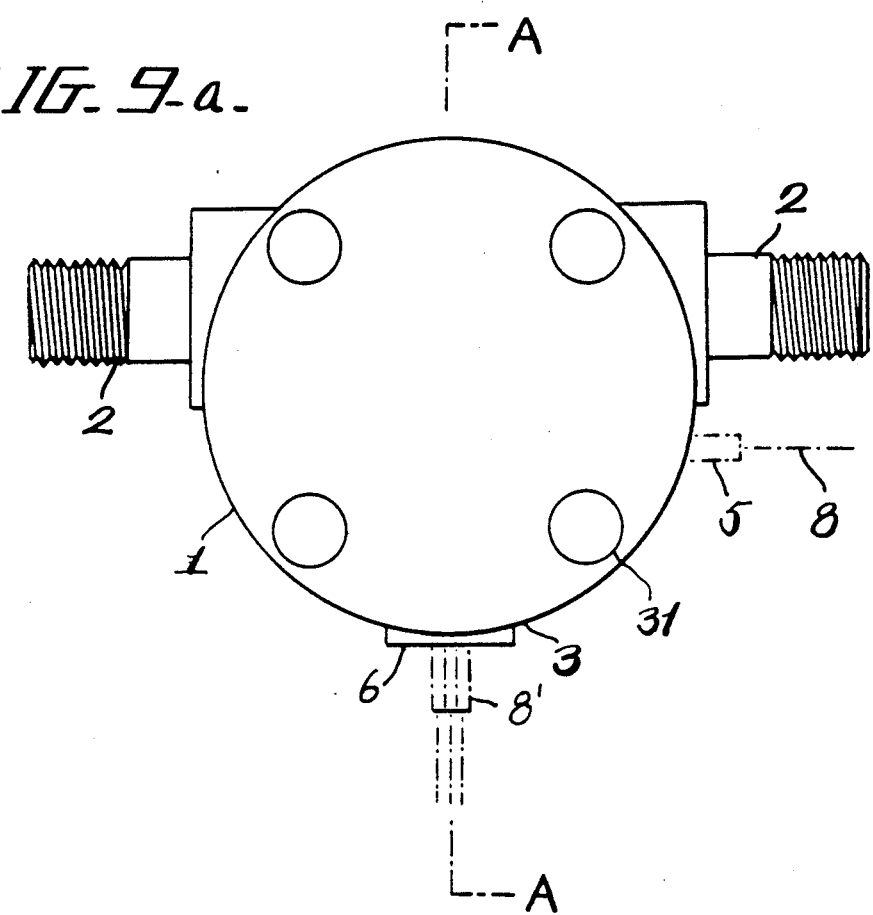
FIG. 9-a.
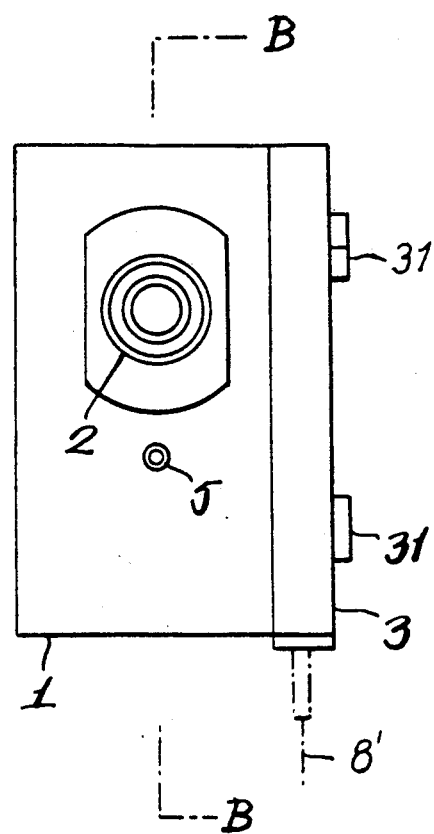
FIG. 9-b.

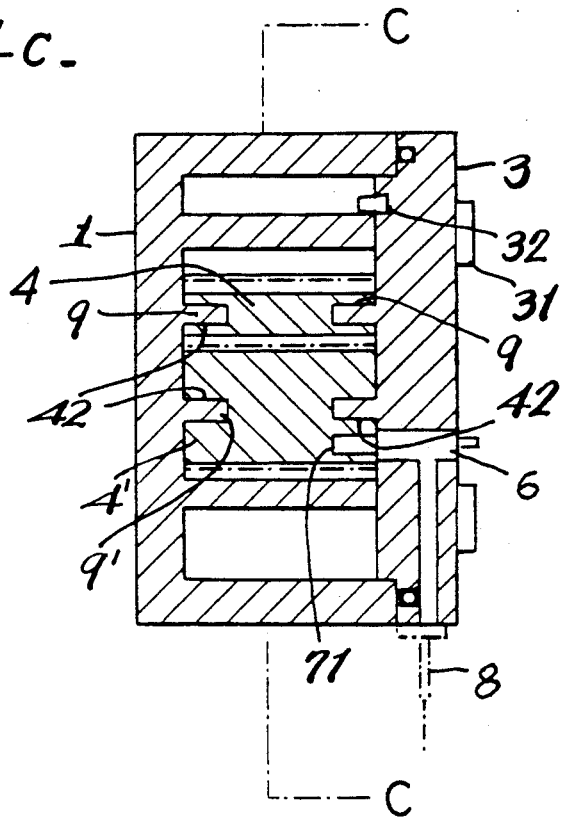
FIG. 9-c.
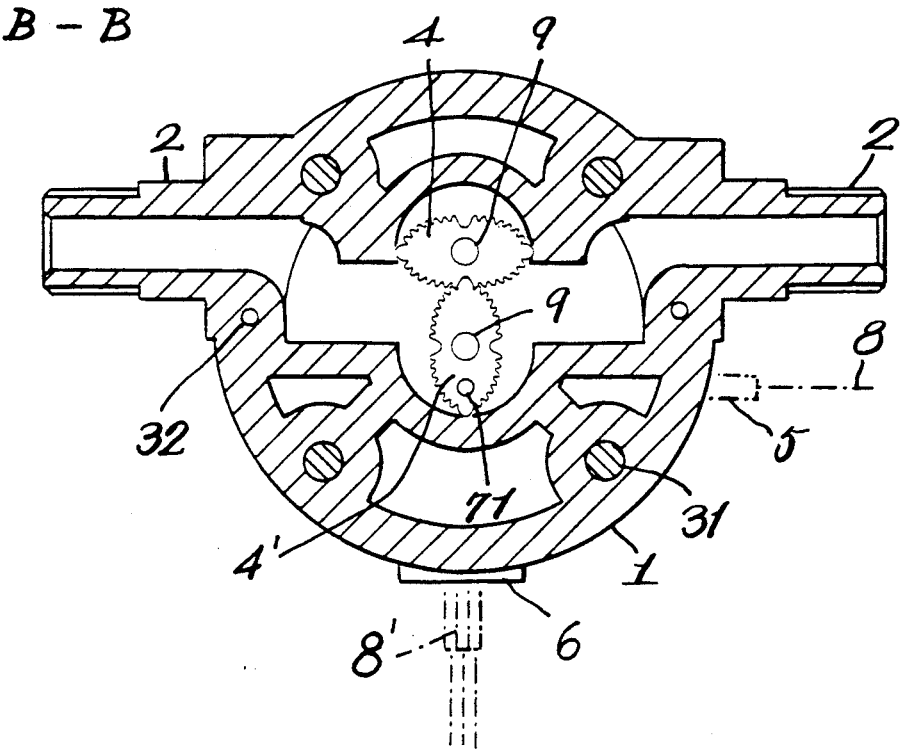
FIG. 9-d.
B-B

FIG. 9-e.
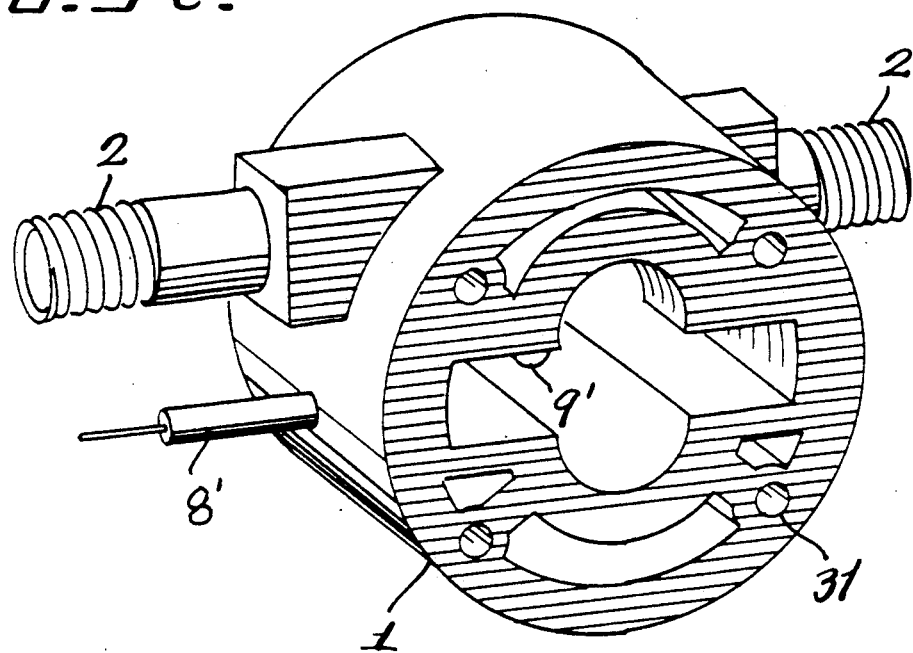
FIG. 9-f.
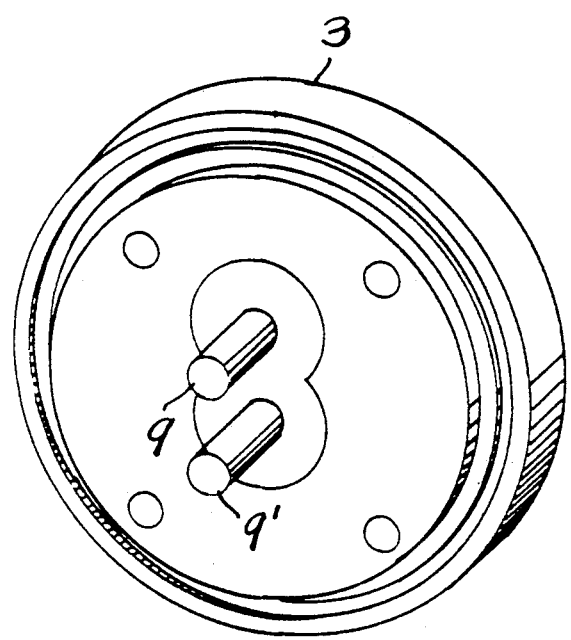

FIG. 9-g. FIG. 9-h.
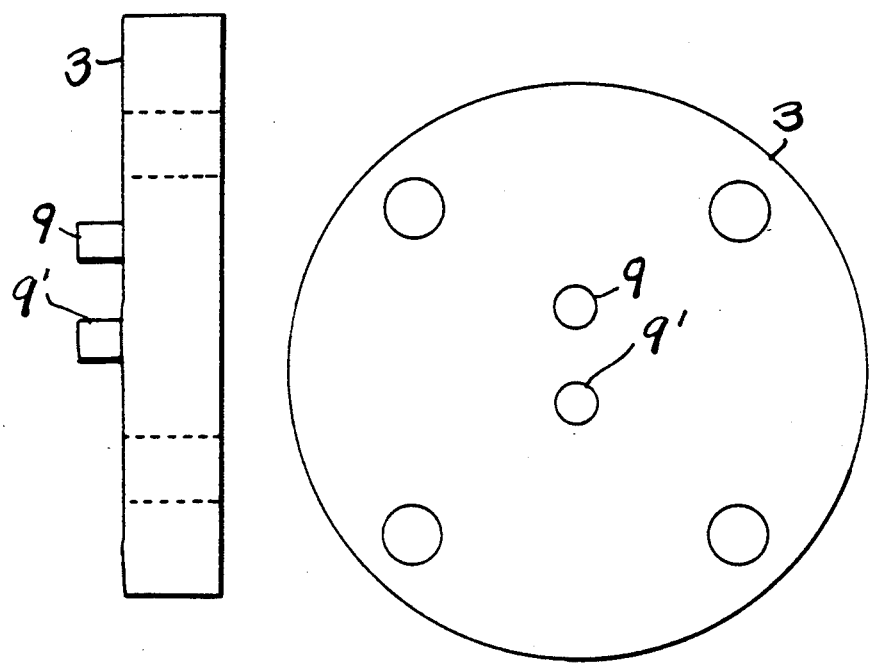
FIG. 9-i.
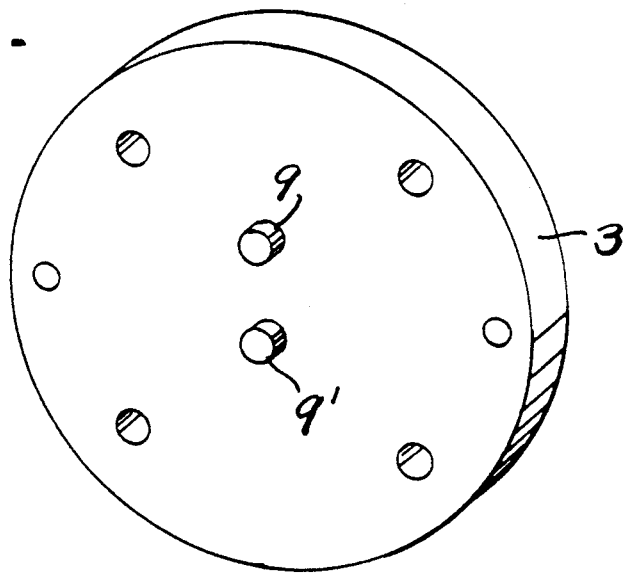

FIG.9-k.
FIG.9-j.
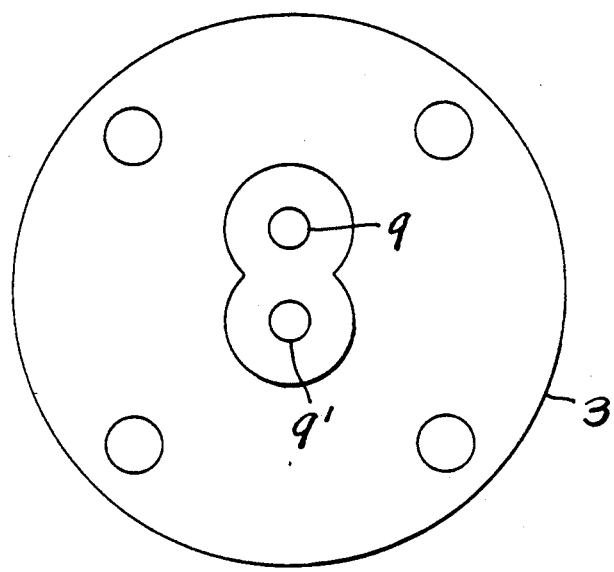
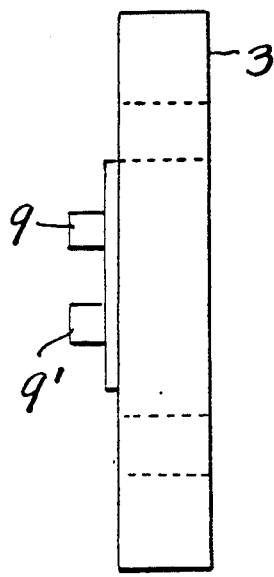
FIG.9-l.
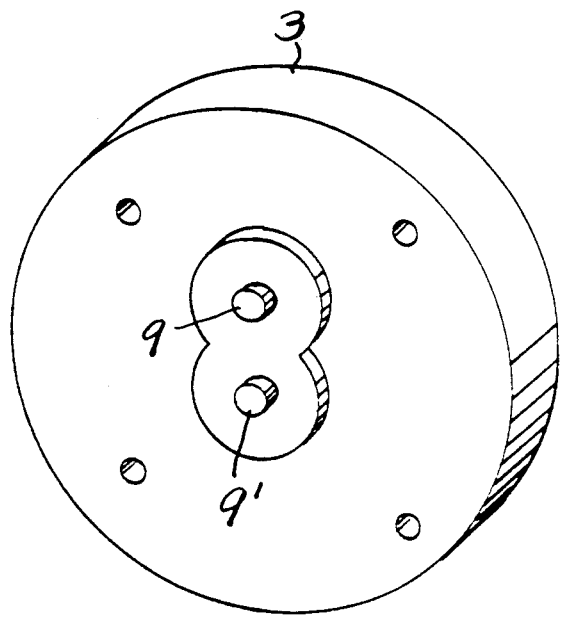

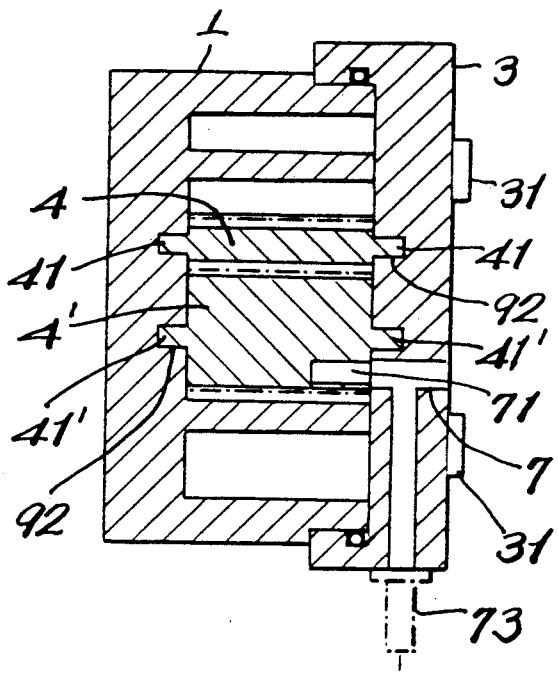
FIG. 10-a.
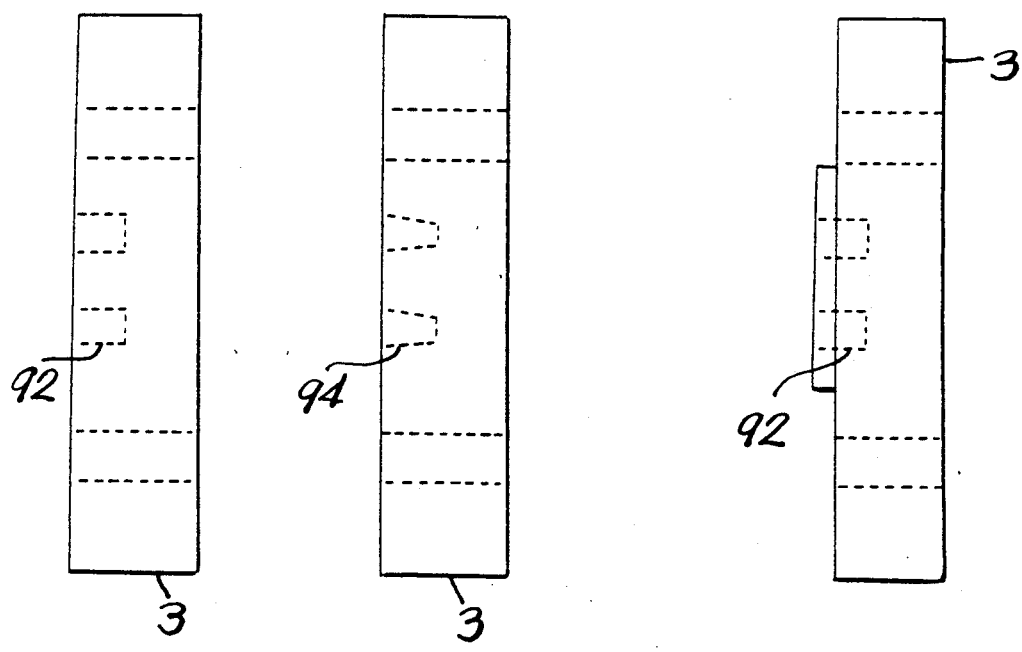
FIG. 10-b. FIG. 10-c. FIG. 10-d.

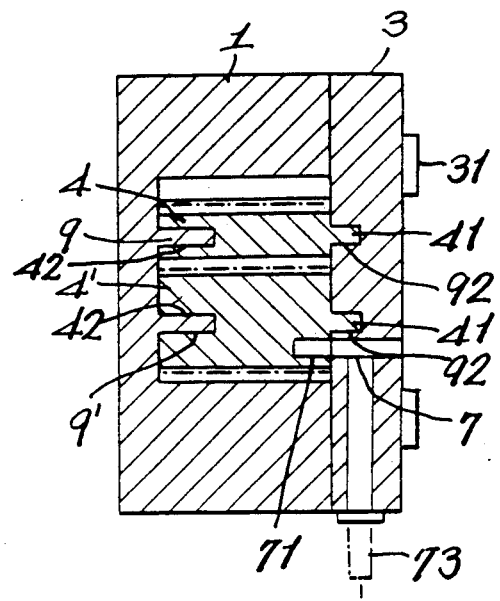
FIG. 11.
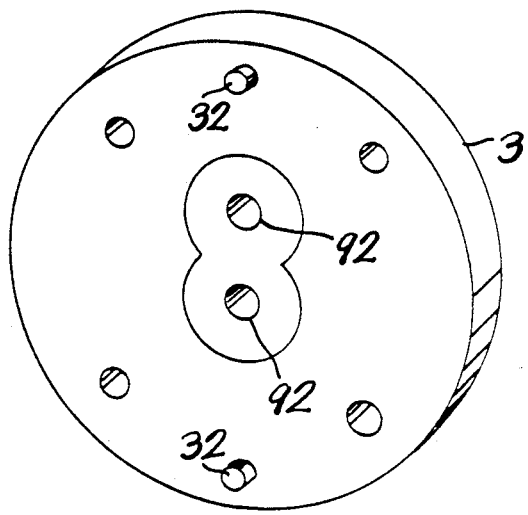
FIG. 10-e.
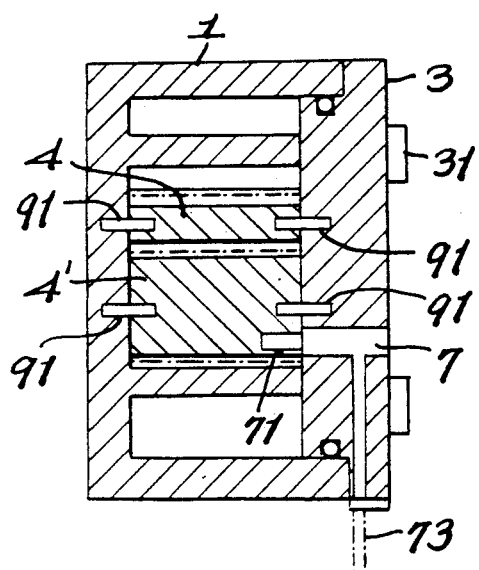
FIG. 12.
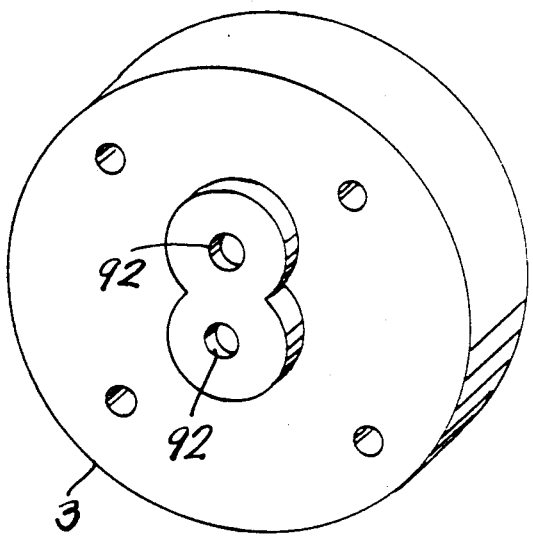
FIG. 10-f.

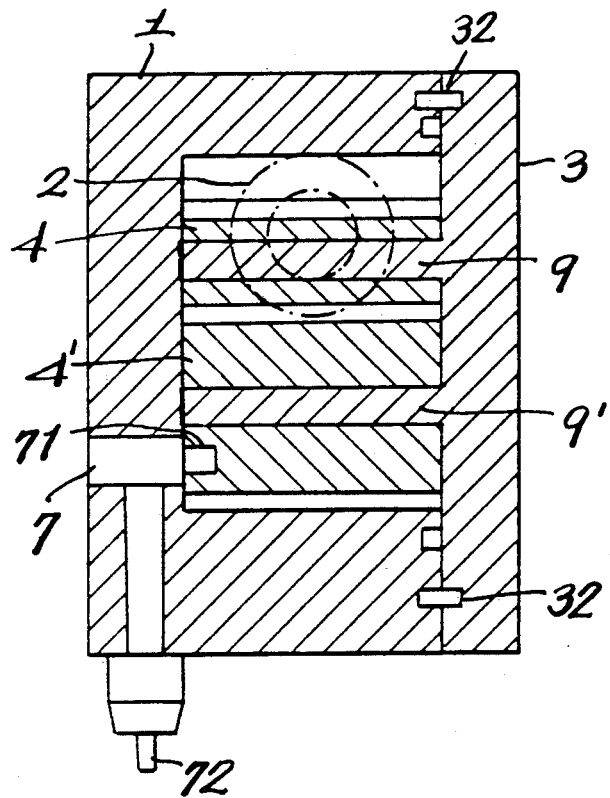
FIG. 13-a.
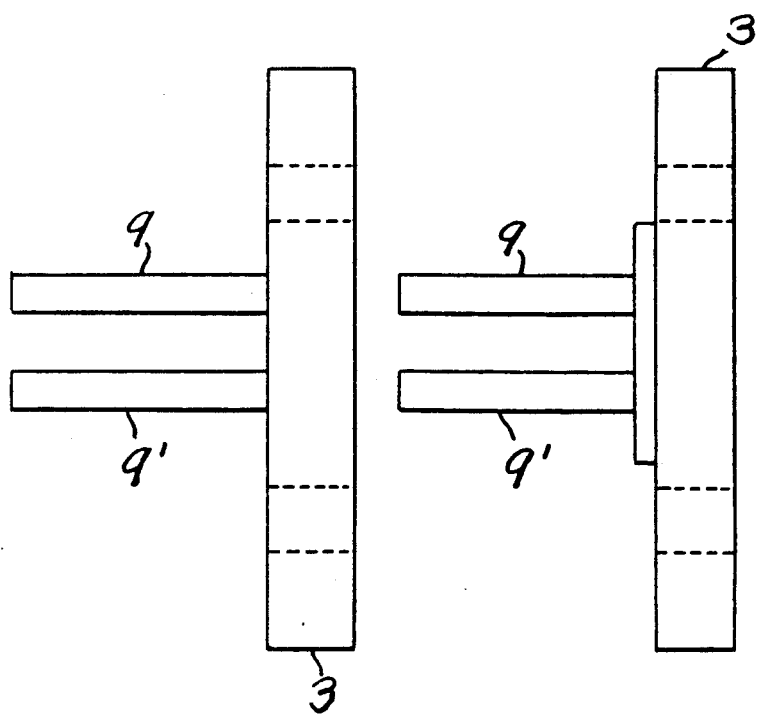
FIG. 13-b.   FIG. 13-c.

FIG. 13-d.
FIG. 13-f.
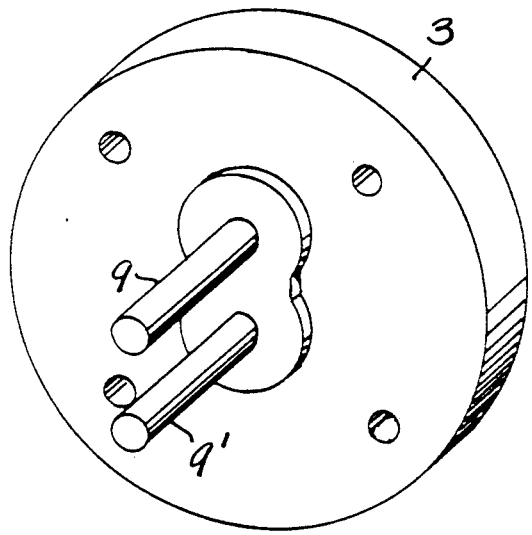
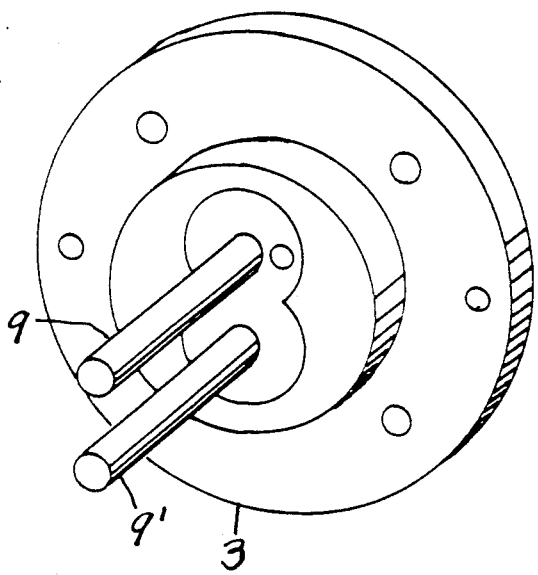
FIG. 13-e.
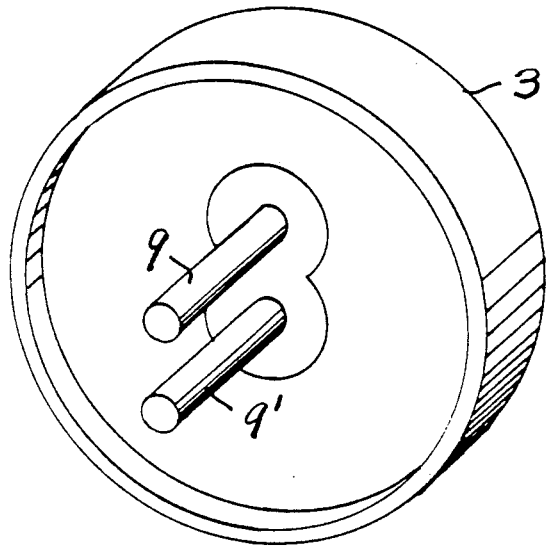

FIG.13-g.
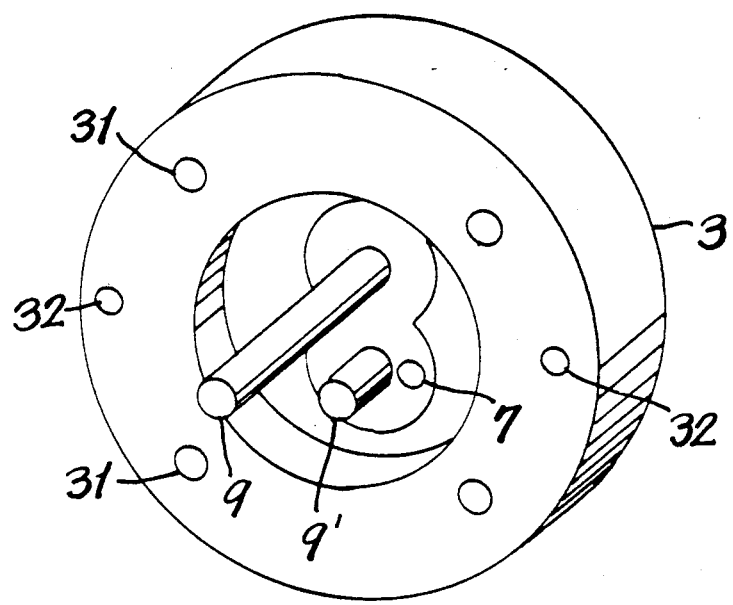
FIG.13-h.
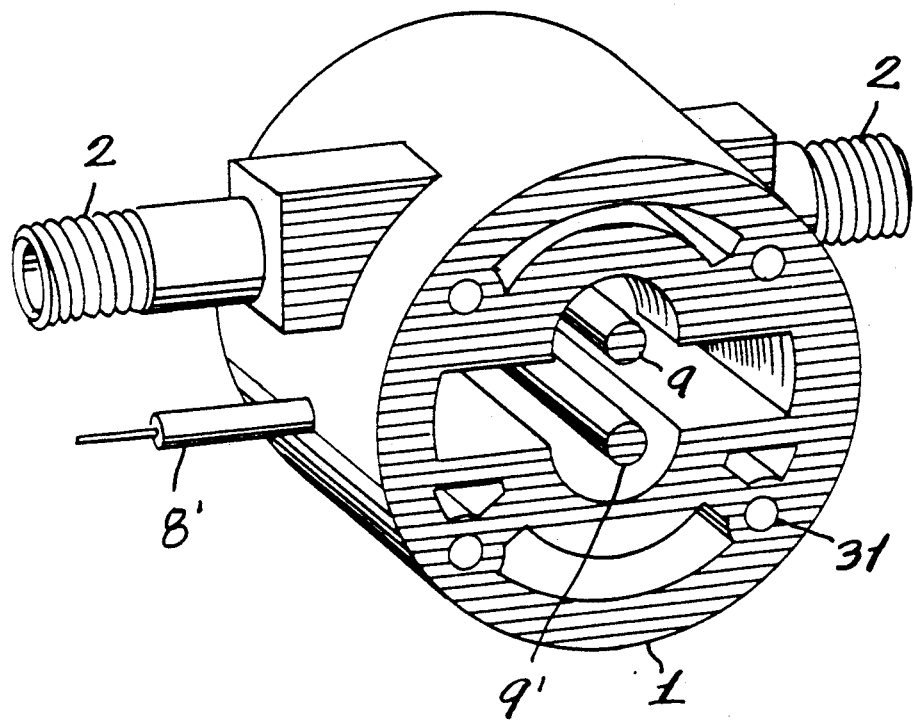

FIG.14-a.
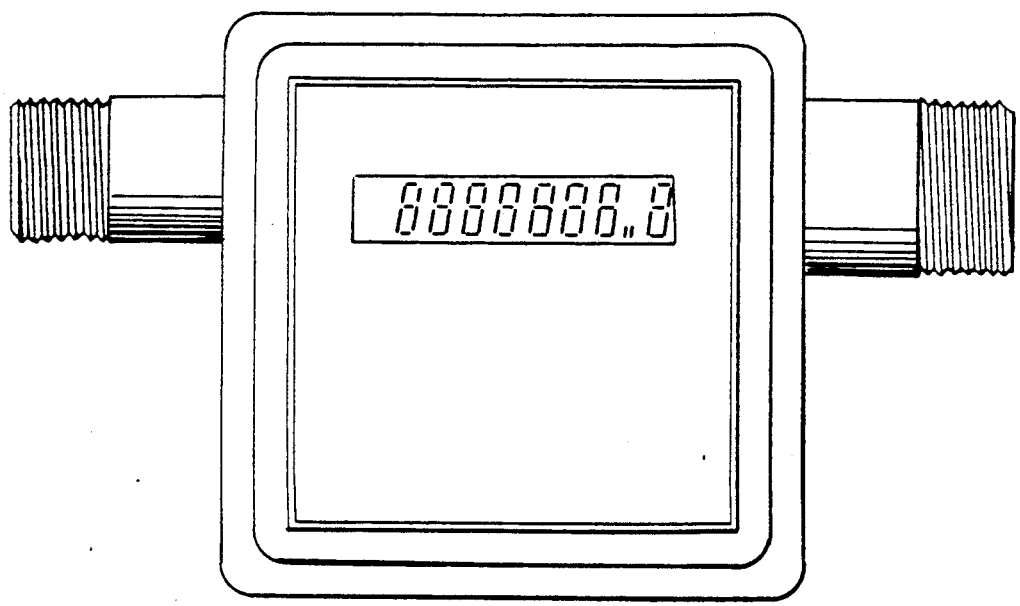
FIG.14-a.
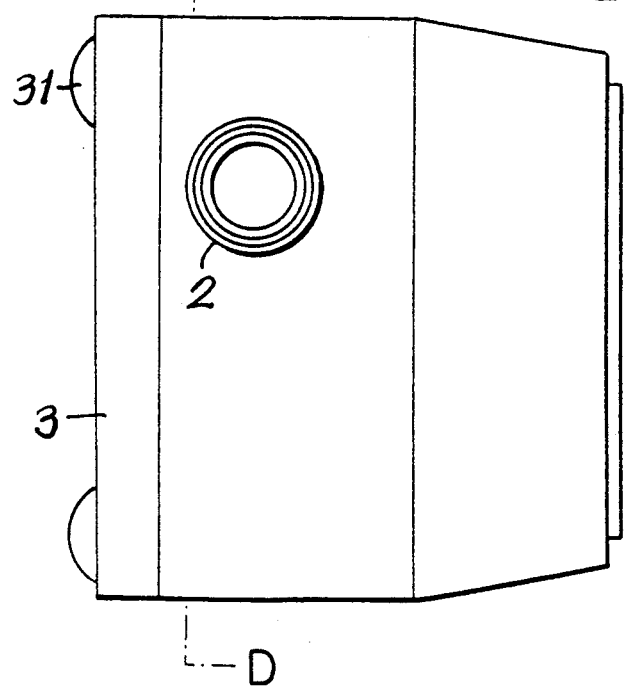

FIG. 14-c.
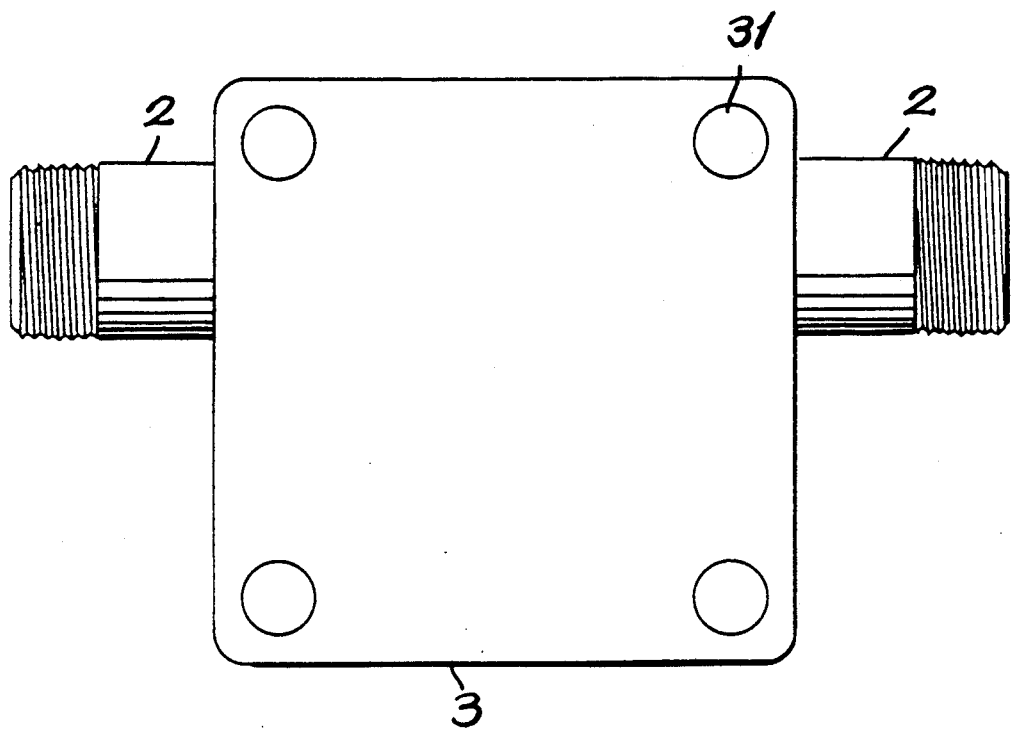
FIG. 14-d.
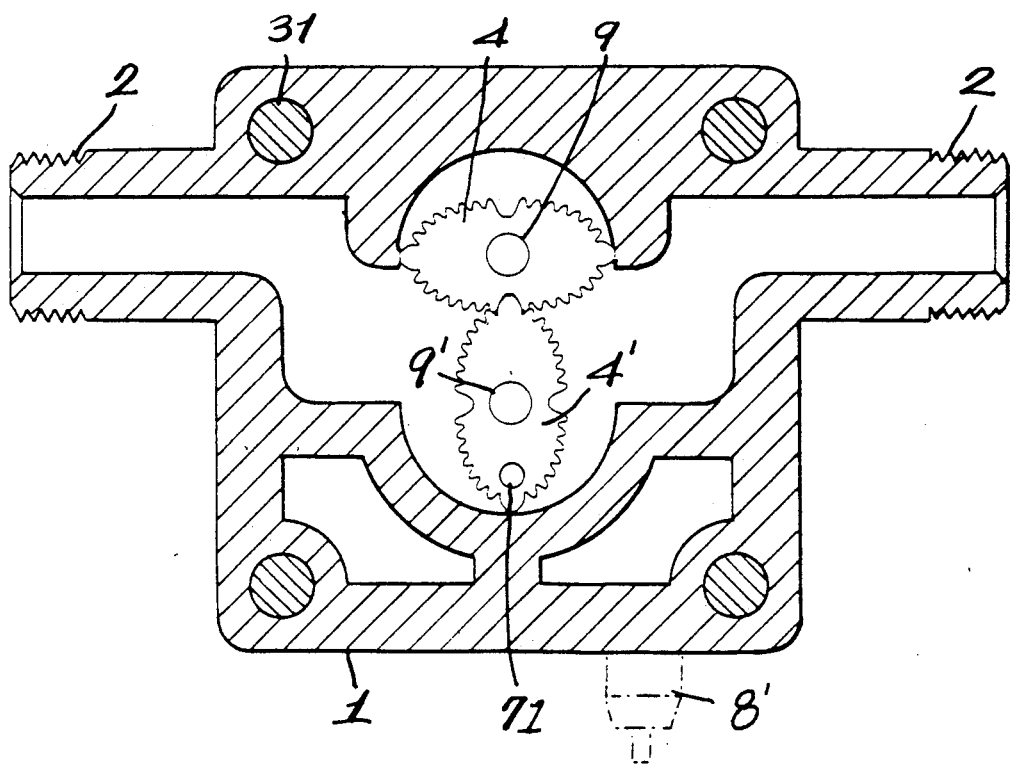

FIG. 14-e.
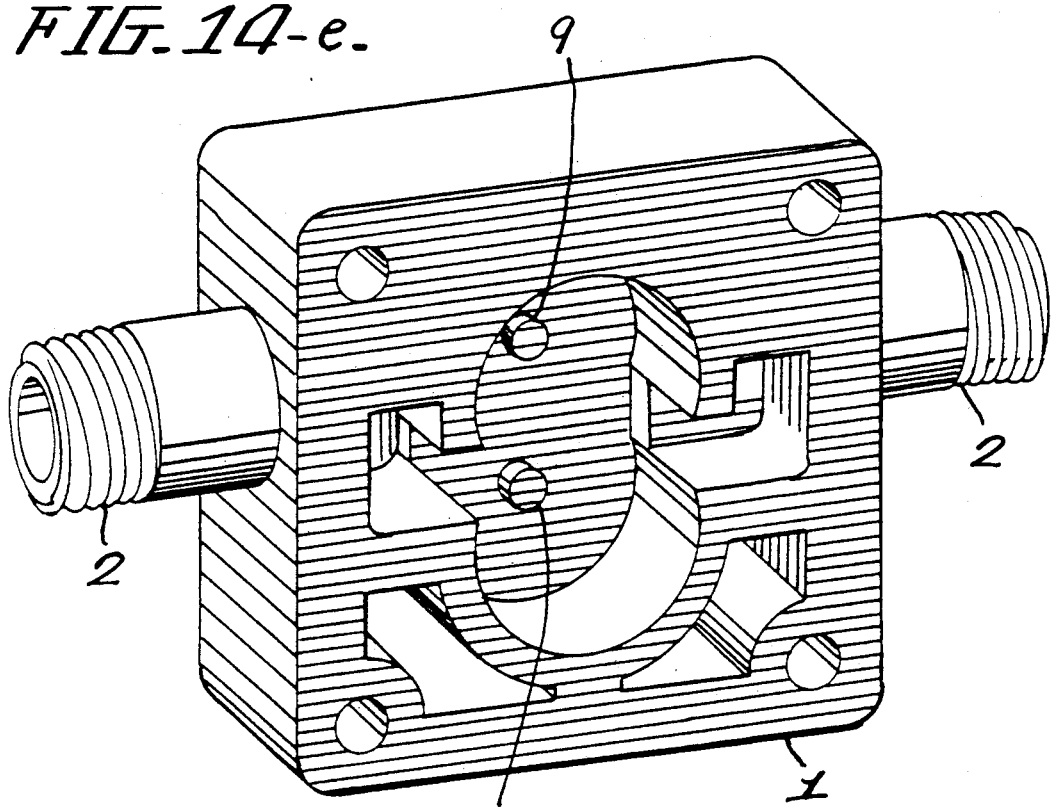
FIG. 14-f.
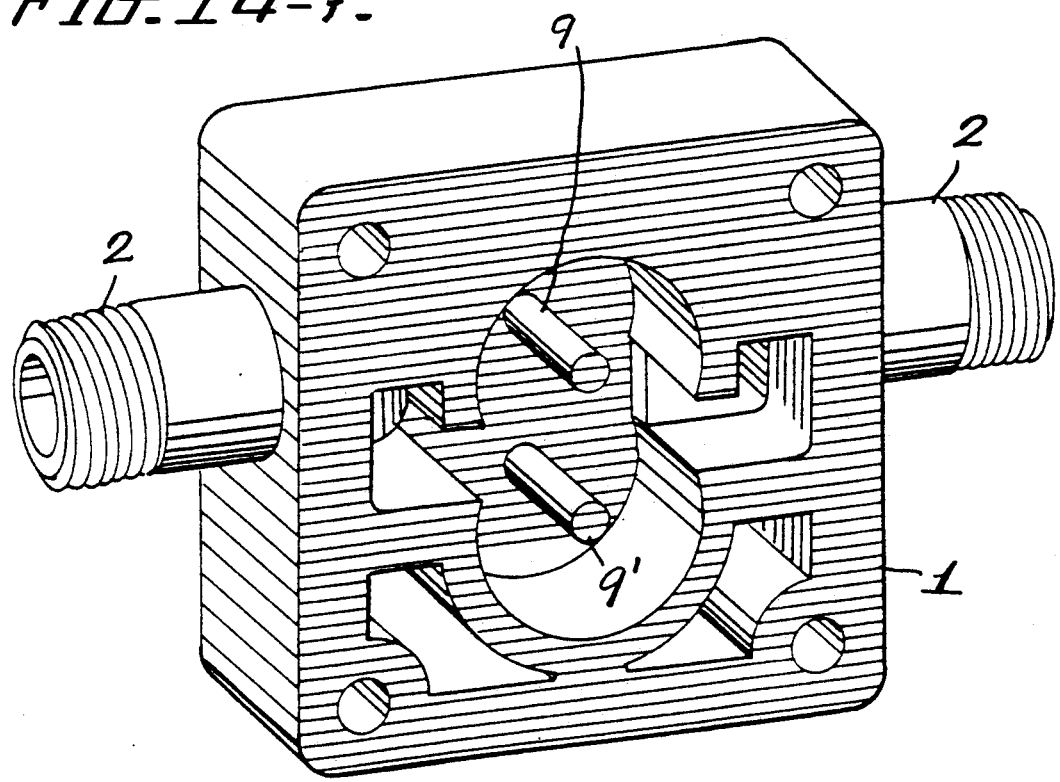

FIG.14-g.
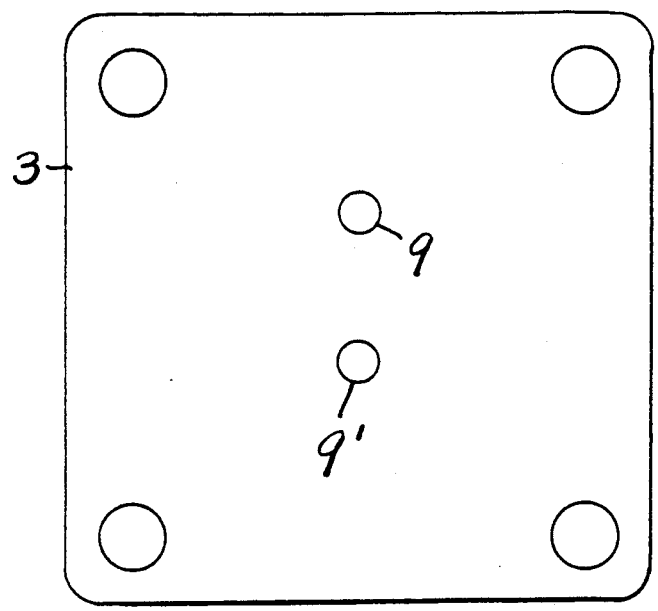
FIG.14-h.
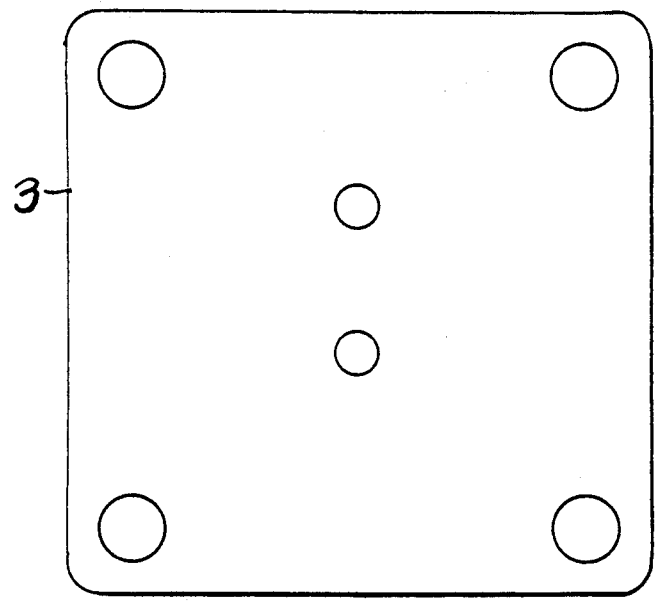

FIG.14-i.  FIG.14-j.  FIG.14-k.
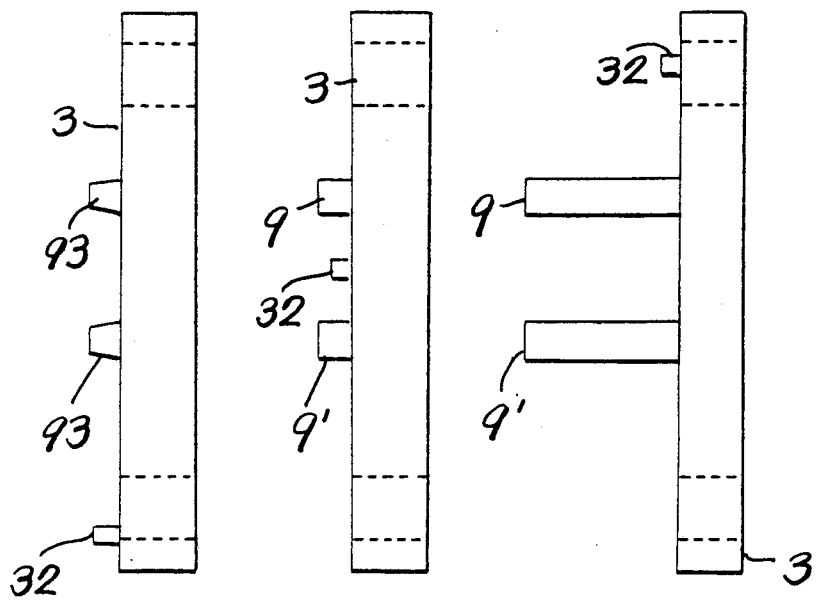
FIG.14-l.  FIG.14-m.
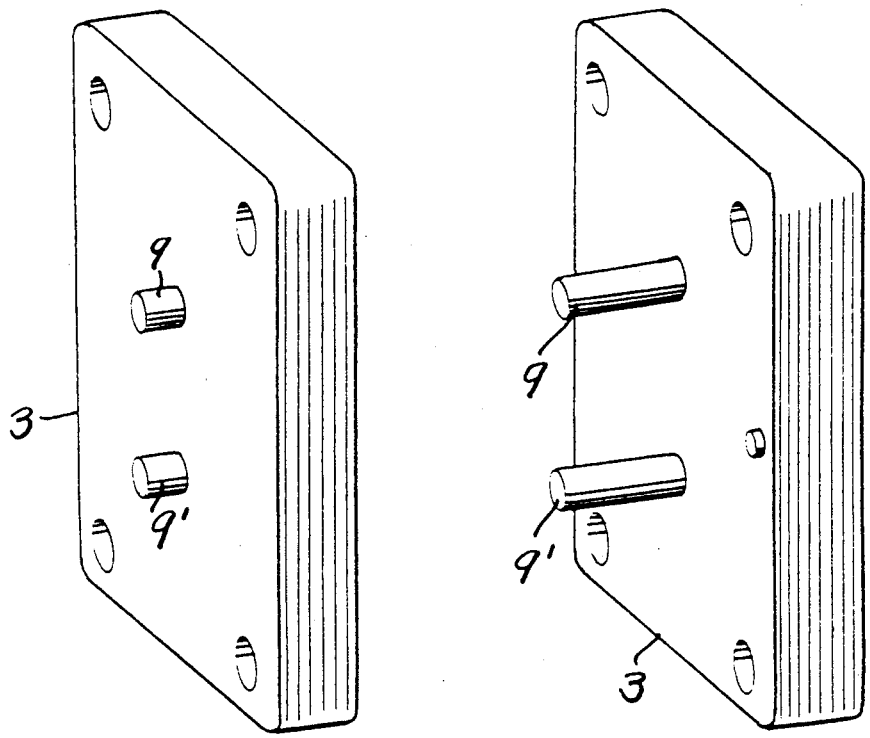

FIG. 14-n.
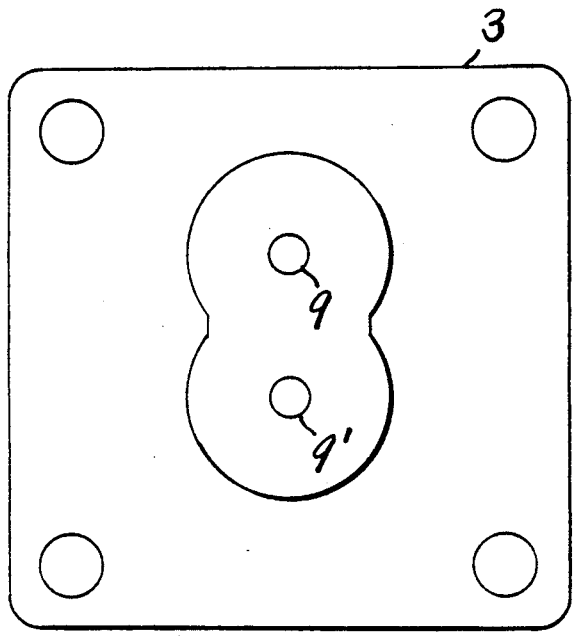
FIG. 14-o.  FIG. 14-p.  FIG. 14-q.
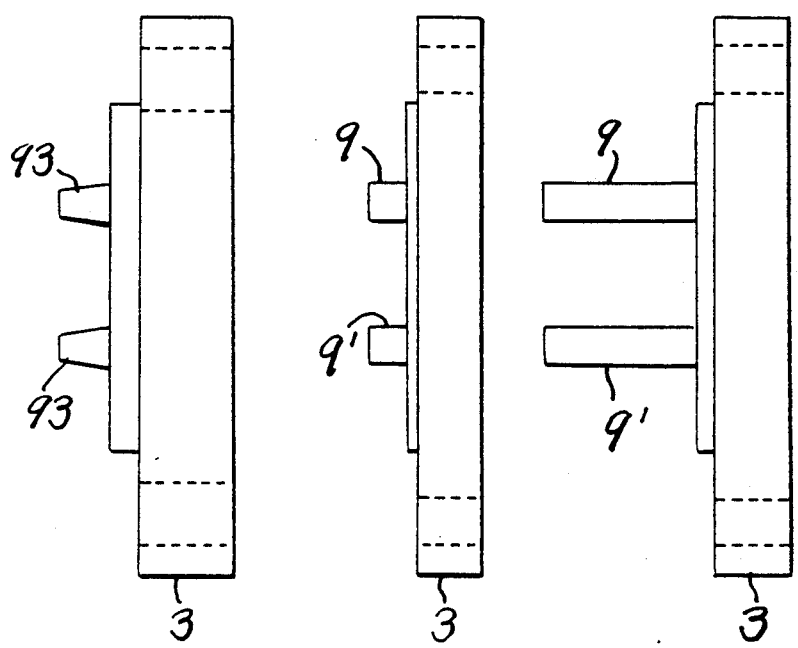

FIG.14-r.
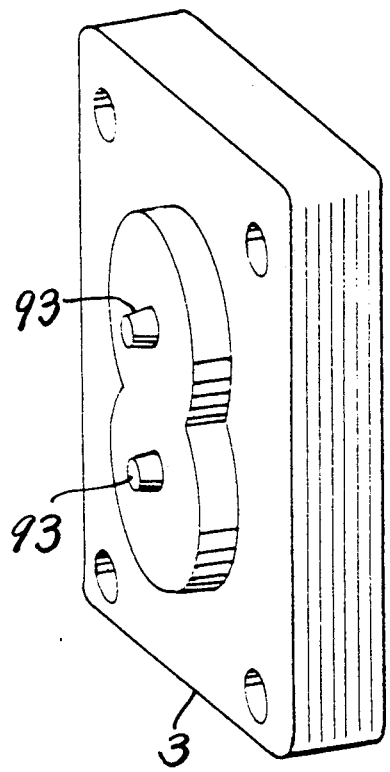
FIG.14-s.
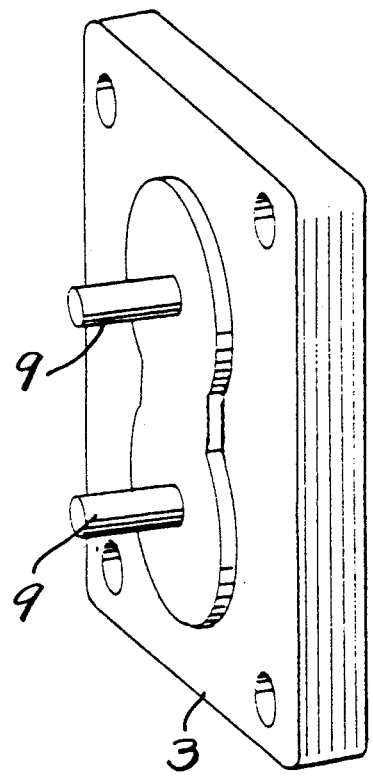
FIG.15-a.
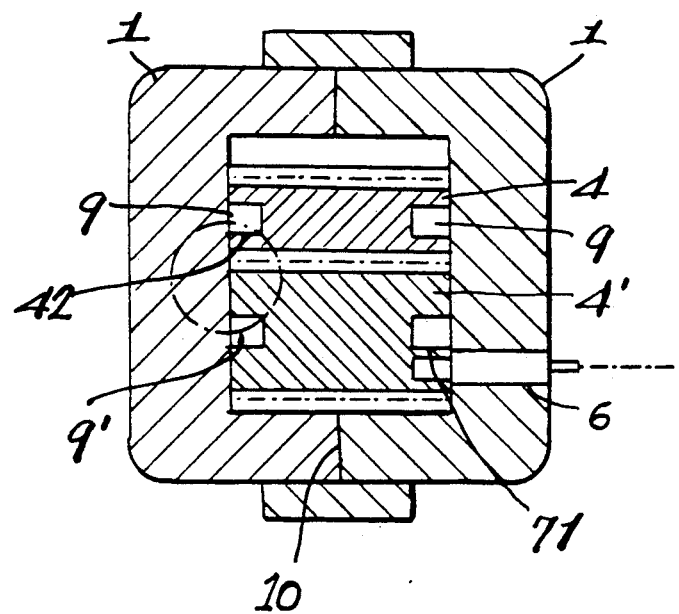

FIG. 15-b.
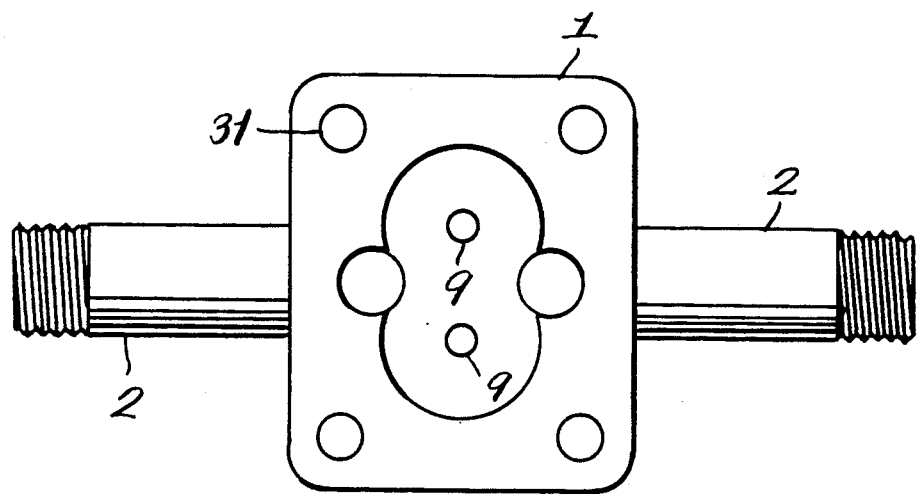
FIG. 15-c.
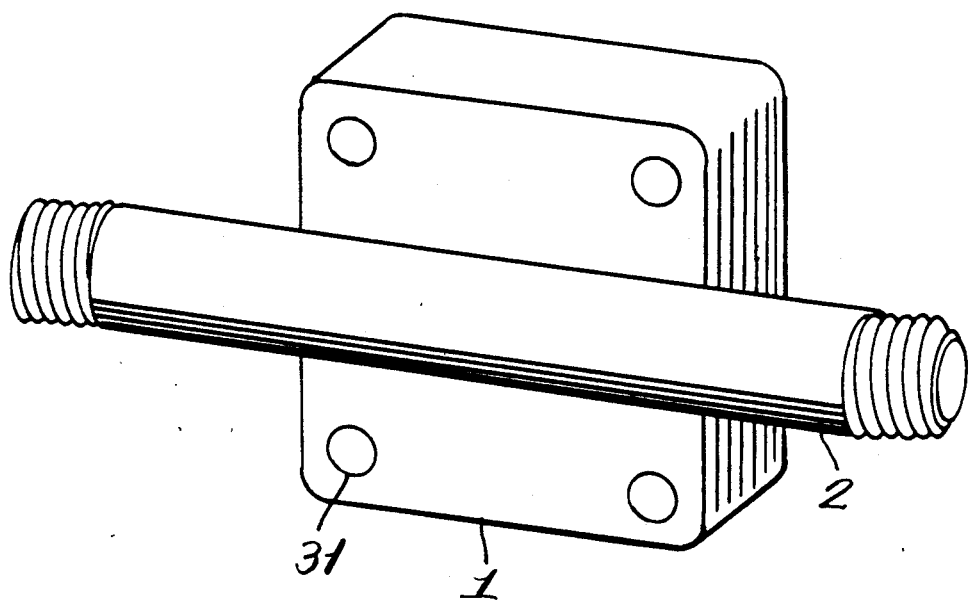

COMPENSATING METHOD AND DEVICE FOR INSTRUMENTAL ERROR IN ROTARY DISPLACEMENT FLOWMETER

BACKGROUND OF THE INVENTION

The present invention relates to a compensating method and device for instrumental error in rotary positive displacement flowmeters. The method and device of the invention are intended for compensation of errors due to flowmeter characteristics, correlations of temperatures and subject fluid volumetric expansion, and correlations of temperatures and viscosities of the fluid. Elliptical gear flowmeters are outstandingly superior in measurement functions to other conventional flowmeters, and therefore most suitable for further enhancing the measurement functions of the present invention in error compensation. Moreover, reliabilities of flowmeters are enhanced by the present invention.

In a rotary positive displacement flowmeter containing in the casing of a pump unit two of the same type elliptical gears having long and short diameters respectively, or "non-circular rotor" gears which are meshing mutually, leakage is prevented by limiting clearance to the minimum possible between the adjacent internal wall surface of the casing of the unit and the top of the tooth on the long diameter of the rotor when the fluid is fed at the entrance of the unit and then is passed through within the casing to be discharged at the exit, and the meshing teeth of the two rotors prevent fluid leakage with the supply and discharge side rotor teeth appearing in the direction of rotor rotation. A small leakage through the above-mentioned clearances cannot, however, be perfectly prevented. Ratios of such leakages vary with the instrument sizes, constructions, and rotational speed of rotors.

Fluids generally used in plant facilities have mostly low viscosities. Fluids of low viscosities have large viscosity variations with temperature, and therefore cannot be exempt from errors even with high precision instruments. Since in low viscosity fluid viscosity variations can result with a smallest temperature change, and therefore errors in accuracies will be inevitably produced, a high technology is needed in temperature control when a measurement is to be conducted in such cases. Generally, it is accepted that non-circular gear flowmeter have high reliabilities. The relation between the flow rate and instrumental error will be unchanged, and therefore super precision measurement can be made possible by compensation methods using microcomputers. Because of mechanical structures in rotary positive displacement flowmeters, leakage of fluids due to pressure differences cannot be perfectly prevented through even the smallest clearances between rotors or the inside wall and rotors. This leakage rate varies with viscosity changes caused by temperature changes in subject fluids and apparatus error increases or decreases throughout the flow rate range.

The action of temperature compensation mechanisms for conventional positive displacement flowmeters is to make a real-time determination of the fluid expansion and shrinkage due to temperature rise and fall during the measurement for continuous conversion to volumes at certain conditions; however the flowmeters do not indicate real correct flows because the fluid viscosity varies with the change in the fluid temperature.

In order to obtain a real correct flow, therefore, it is needed to exclude the influences on instrumental errors caused both by volumetric changes and viscosity changes due to changes in the fluid temperature. Viscosity changes in the subject fluid due to process temperatures changes, similar to specific gravities, represent correlations between instrument errors and viscosities. Consequently viscosity changes as well as specific gravity changes should be determinated on real-time to be used for compensation in conversion for a more correct flow rate. Though it is difficult to determine the smallest viscosity changes instantaneously, a precise measurement of changing temperatures on real-time is practical, and it is feasible to obtain compensation value of higher resolution by using temperature measurements.

SUMMARY OF THE INVENTION

The object of the present invention is to exclude errors arising from viscosity changes accompanied by temperature changes in the subject fluid between the flow-rates indicated from rotational motion of measurement elements in flowmeter rotors and the real correct values observed in order to indicate the real correct flowrate. As a subject fluid in pipings in a chemical plant is subject to temperature changes and consequential volume changes, a compensation is needed to give volumes at a reference temperature. These temperature changes essentially bring forth corresponding viscosity changes, and therefore other instrumented errors will be added; the compensated values for these errors should be determined from the temperature condition of the fluid causing changes in viscosity or as a function of fluid temperature. In order to make other modifications of indicated values there exist certain correlations between instrumental errors and fluid temperatures, and further certain different certain different correlations for different instrumental structures. Measurement accuracies can be enhanced and more advanced process controls are feasible by making real-time compensation of instrumental errors due to viscosity changes from varying temperatures by the use of temperature sensors installed within the instrument or at locations adjacent to the fluid path.

Between the instrumental error-flow-rate curve assumed to be ideal values, and rotor rotational speed-instrumental error curve and temperature change-instrumental error curve, there exist certain respective relations, and these are represented to be other errors. Indication of more correct measurement values are made possible by making compensations with certain respective ratios. These correct indications can be utilized for super precision measurement, and process control especially in fine chemical fields. Non-circular gear flowmeters have high accuracies, and can guarantee 0.1% accuracies and are further guaranteed by adding electronic compensation mechanism to such a high precision flowmeter. A modification system using compensation values compensating for errors arising from viscosity changes in addition to volumetric changes due to temperature changes of the subject fluid can provide a super precision flowmeter of higher guaranteed accuracies or 0.05% accuracies or higher which is in great demand in fine chemical fields.

In the case of non-circular gear flowmeters, testings of fresh water running at approximately 20° C. have shown that instrumental errors variation due to viscosity changes from 1° C. temperature changes has shown 0.027%, compared to the compensated values for the specific gravity change of the same temperature change. In the high temperature range and low temperature range increasing or decreasing tendencies are observed for the above-mentioned values. Assuming these values of increase or decrease to be values of compensations due to temperature changes, these values of compensation have shown varied values with design specifications of flow measuring instruments, and the same value of compensation can be used for the same specification to convert the measurement values.

Means of the present invention consists in the compensation using the viscosity converted to the one at a measured temperature and determined because the accuracies of temperature measurement is much higher than the real-time measurement of viscosities of a subject fluid. This means is a system to compensate error values arising from theoretical instrumental error-flow rate curves due to micro-temperature changes in the course of a process. Depending upon the dimension of non-circular gear flowmeter rotors and designs of the bodies for performing measurement functions, there exist certain relations between the rotational speed of the rotors and instrumental errors thereof. Referring to FIGS. 1-4 of the drawings, the curve shows flow rates Q along its abscissa and instrument error along the ordinate. As shown in FIG. 1, certain relations are represented between the theoretical curve (a) and instrumental error-rotor rotational speed curve (B). That is, by adding instrumental error values (E) increasing in high and low rotational speed of the rotor to the converted flow-rate calculated from the rotor rotation, compensating instrumental errors specific to instruments, and making additions with an arithmetic unit, a real correct flow-rate is indicated. Moreover, because the specific gravity and viscosity of the subject fluid can be varied by a smallest temperature change even with the case of the same specification, the flow-rate calculated for indication by the rotor rotational speed should be added with other corresponding compensation values. The curve (A) in FIG. 2 shows the theoretical curve for instrumental error vs. flow-rate, curve (B) shows the curve for instrumental error vs. flow-rate at above temperatures, curve (D) shows the instrumental error-flow curve for higher temperatures than curve (B) and curve (C) represents the case at lower temperatures than curve (B). The experimental result reveals that the discrepancies at the peak X1 and X2, low rotation speed range Y1 and Y2, and high rotation speed range Z1 and Z2 are not proportional to temperature changes, and show specification changes compared with peak X0, lower rotation speed range Y0 and high rotation speed range Z0 of line (B), respectively.

Instrumental error vs. flow rate curves represent also specific shapes depending upon the viscosities of subject fluids of different kinds, and the values of the curve also increase for low viscosity fluids. And where the reference temperature has been established at 20° C., the instrumental-flow rate curve (B) is drawn by modifying the curve (C) or (D) or making condition compensation with the condition compensation values for excluding the influences of viscosities. By this procedure the error (E) in FIG. 1 is excluded by the compensation system in FIG. 2, the ideal curve (A) is obtained, and real correct values are calculated. Real correct values are, therefore, obtained by compensating the flow-rate with the instrumental error corresponding to the rotor rotational speed or in accordance with the instrumental characteristic curve determined by the specification of the instrument proper.

FIG. 3 shows a curve for a liquid of low viscosity, and, similar curves may be shown for an instrument with larger clearance between rotors where much internal leakage exists. A fluid of high viscosity, or flowmeter with smaller clearance values in the body thereof and consequential smaller internal leakages, is represented as QE curve in FIG. 4.

BRIEF DESCRIPTION OF THE DRAWINGS

The invention will now be described in detail with reference to the accompanying drawings wherein:

FIG. 9-a is a side elevational view of an instrument incorporated with temperature sensors and rotation magnetic sensors;

FIG. 9-b is a front elevational view thereof;

FIG. 9-c is a cross-sectional view taken along line A—A in FIG. 9-a;

FIG. 9-d is a cross-sectional view taken along line B—B in FIG. 9-b;

FIG. 9-e is a perspective view illustrating the interior of a flowmeter proper shown in FIGS. 9-a to 9-d;

FIG. 9-f is a perspective view of a side cover shown in FIG. 9-a;

FIG. 9-g is a side elevational view of FIG. 9-f;

FIG. 9-h is an elevational view of the cover of FIG. 9-g;

FIG. 9-i is a perspective view of another cover;

FIG. 9-j is a view similar to 9-h showing another embodiment of cover;

FIG. 9-k is a side view of FIG. 9-j;

FIG. 9-l is a view similar to FIG. 9-f of the embodiment of FIG. 9-j;

FIG. 10-a is a view similar to FIG. 9-c of a different embodiment;

FIGS. 10-b, 10-c, and 10-d are views similar to FIG. 9-g showing further embodiments of cover plates;

FIGS. 10-e and 10-f are perspective views of different embodiments of cover plates;

FIG. 11 is a cross-sectional view of another similar embodiment of flowmeters of the invention;

FIG. 12 is a cross-sectional view of another embodiment of the flowmeter having a short shaft shown;

FIG. 13-a is a cross-sectional view of a further embodiment where the casing and a long shaft have been integrally formed, FIG. 13-b and FIG. 13-c are side views of a synthetic resin side covers formed integrally with long shafts, FIGS. 13-d to 13-g are respective perspective views of different embodiments of synthetic resin covers wherein the cover and shafts are formed integrally, and FIG. 13-h is a perspective view of a synthetic resin casing where the casing and long shafts are formed integral;

FIG. 14-a is a side view of a flowmeter structured integral with an indicator section, FIG. 14-b is a front elevation of FIG. 14-a, FIG. 14-c is a rear view of FIG. 14-a, FIG. 14-d is a cross-sectional view taken along line D—D in FIG. 14-b, FIG. 14-e and FIG. 14-f are perspective views showing the inside of a synthetic resin casing formed integral with long or short shafts, respectively, FIG. 14-g and FIG. 14-h are inside views of the side cover of FIG. 14-b, FIG. 14-i, FIG. 14-j and FIG. 14-k are side views of different embodiments of the side cover, FIG. 14-l and FIG. 14-m are perspective views of different embodiments of the side cover, FIG. 14-n is an elevation view of the inner side of a synthetic resin cover where the shafts are formed integral with the side cover provided with a packing part, FIG. 14-o, 14-p and 14-q are side views of different embodiments of covers, and FIG. 14-r and FIG. 14-s are perspective views showing the inside of different embodiments of the side cover;

FIG. 15-a is a cross-sectional view of an embodiment of the invention wherein short shafts are formed integral with the inside of two casing members forming the casing, and FIG. 15-b and FIG. 15-c are front elevational and rear perspective views, respectively, of a further embodiment;

FIGS. 24a and 24b are diagrams showing a process of drawing a QE curve for insertion of data;

FIG. 25 shows QE curves calculated by the method of FIGS. 24a and 24b;

FIG. 26 shows QE curves compensated by the above method;

FIG. 27 shows QE curves compensated by temperature and specific gravity coefficients; and FIG. 28 shows QE curves compensated by temperature vs. specific gravity and temperature vs. viscosity coefficients.

DETAILED DESCRIPTION OF THE PREFERRED EMBODIMENT

In this embodiment flow rate calculator means calculates an instantaneous flow rate based on the frequency of the output signal of the flow meter and generates an output signal indicative of the instantaneous flow-rate. Flow-rate compensation section identifier means identifies, in response to the output signal of the flow-rate calculator means, a specific one of predetermined flow-rate compensation sections to which the calculated instantaneous flow-rate belongs, and generates a signal indicative of the identified section. Compensation constant selector means stores in advance a plurality of compensation constants necessary for calculating an instrumental error of the flow meter, selects a specific compensation constant in response to the output signal of the identifier means, and generates a signal indicative of the compensation constant.

Furthermore, the compensation constant selector means is connected to an input-output unit comprising an ROM for storing series of volume coefficients for the liquid based on different temperatures and viscosities of the liquid.

A rotation detector sensor for input of pulse signals to indicate a measurement per revolution of the rotor of the flow meter and a temperature sensor to detect the fluid temperature and a micro-computer are provided. A pickup coil or the like senses rotations of a rotor which is rotated by a fluid flowing through the flowmeter, the rotations being converted into electrical pulses. The period of the above-mentioned flow-rate pulse signal is measured, a flow-rate per one rotation pulse is read out from data of the period previously stored in ROM (read only memory) and compensated flow-rate, and a real-time temperature compensation coefficient is read out from the specific gravities for each temperature stored in ROM and temperature compensation data indicated, and then the above-mentioned flow-rate for each of the above-mentioned pulses is modified. This modified flow-rate is further compensated by the following method: a modification value is determined by the compensation coefficient obtained by the viscosity-instrumental error correlation to temperatures from the compensation coefficient data stored in ROM for indicating viscosities previously for each temperature, and the above-mentioned modified flow-rate is added with said modification value for real-time modification. When a flow-rate Q is calculated, the flow rate Q is identified. Thereafter, based on data which were computed in advance using instrumental errors of flow-rates Q, a compensation coefficient is determined.

The calculated coefficient is used for compensating for an error. The data are obtained from actually measured instrumental errors by a method of tolerance.

Figure 1:
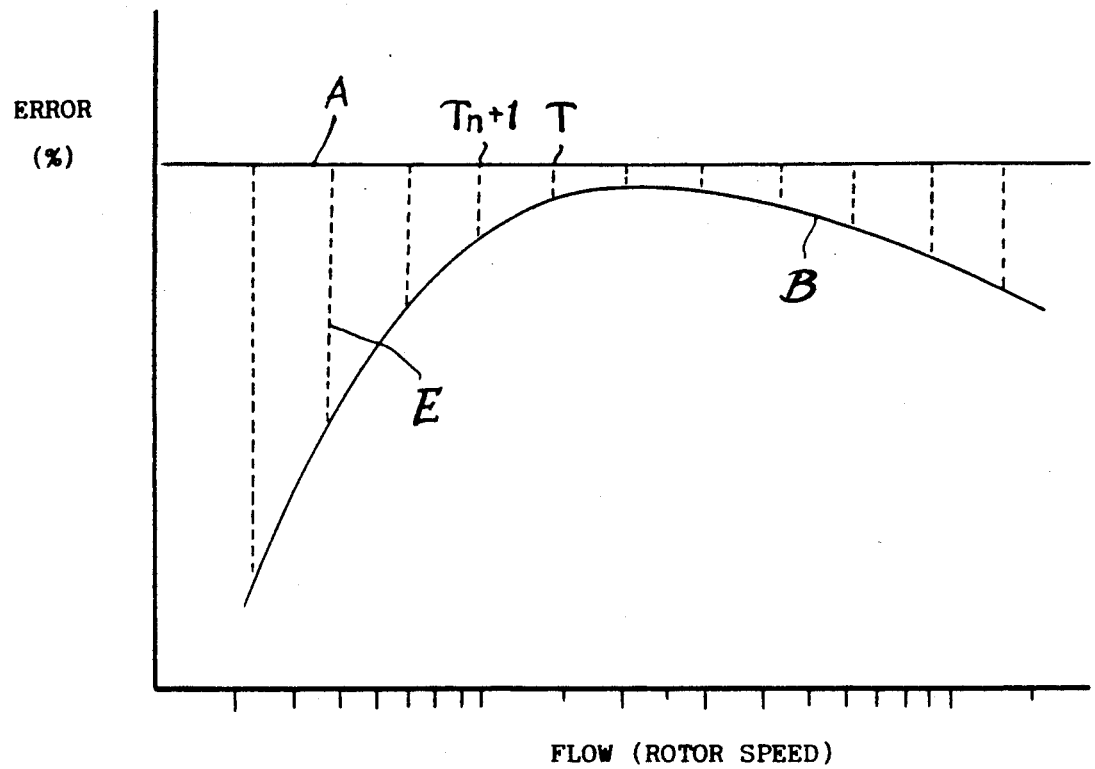
FIG. 1 shows a curve QE (flow rate vs. metering error) for illustrating the correlation between instrumental errors and rotor rotational speed.
Figure 2:
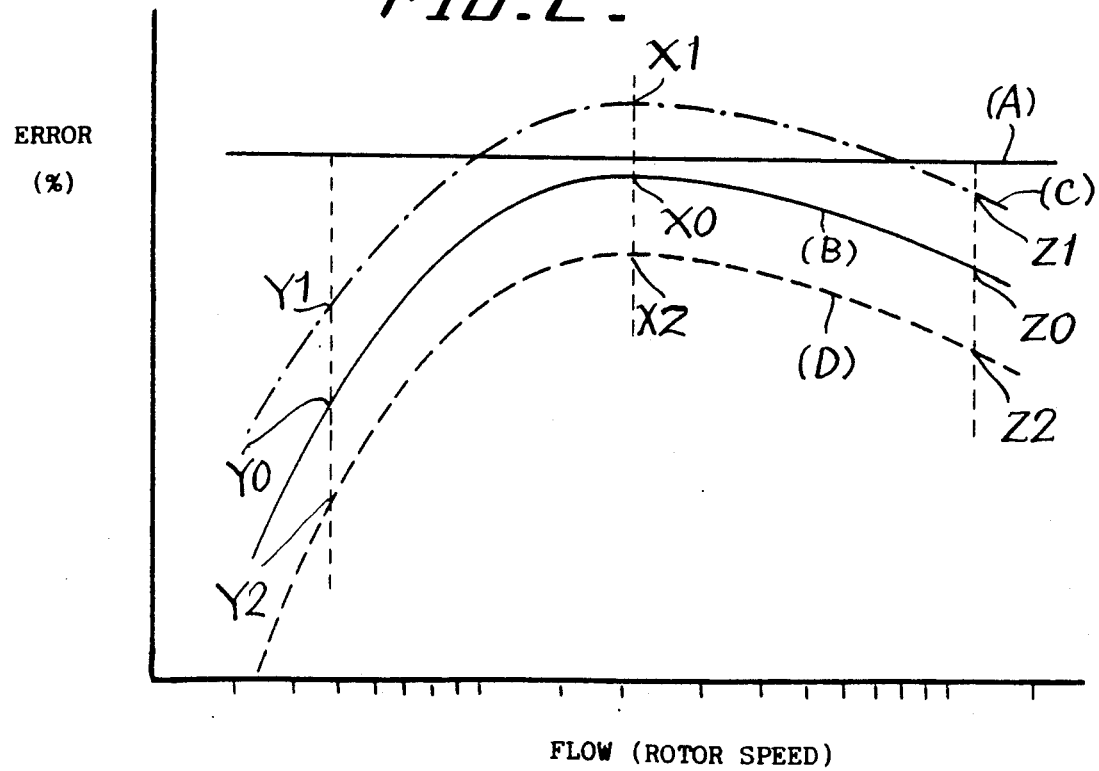
FIG. 2 shows another QE curve of a subject fluid compensated for viscosity index and volumetric expansion coefficient at a high temperature for comparison to the curve at a reference temperature.
Figure 3:
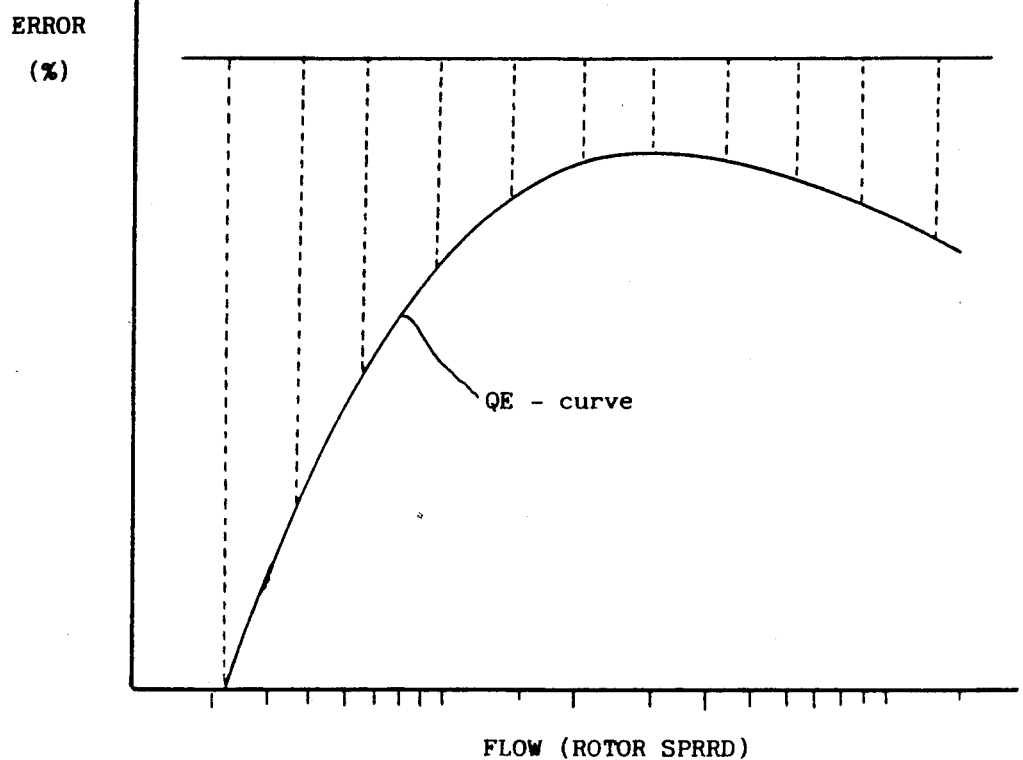
FIG. 3 shows another QE curve for an instrument with large clearances.
Figure 4:
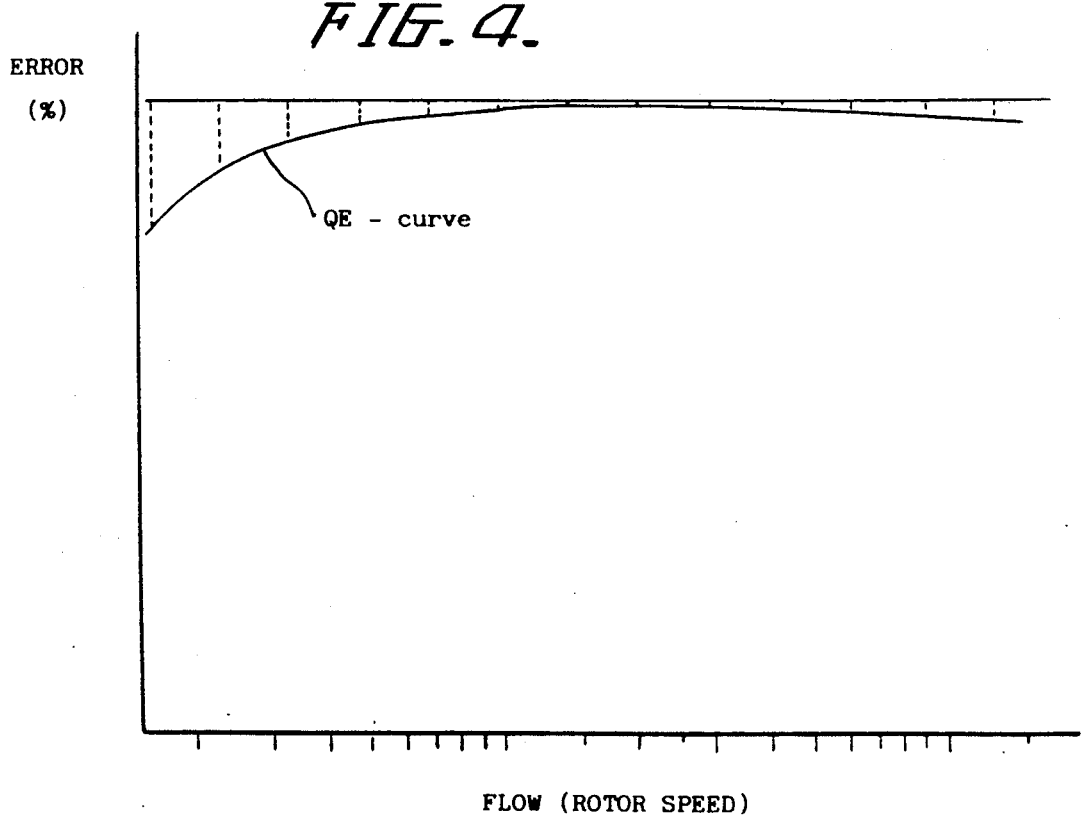
FIG. 4 shows another QE curve for an instrument with smaller clearances.
Figure 5:
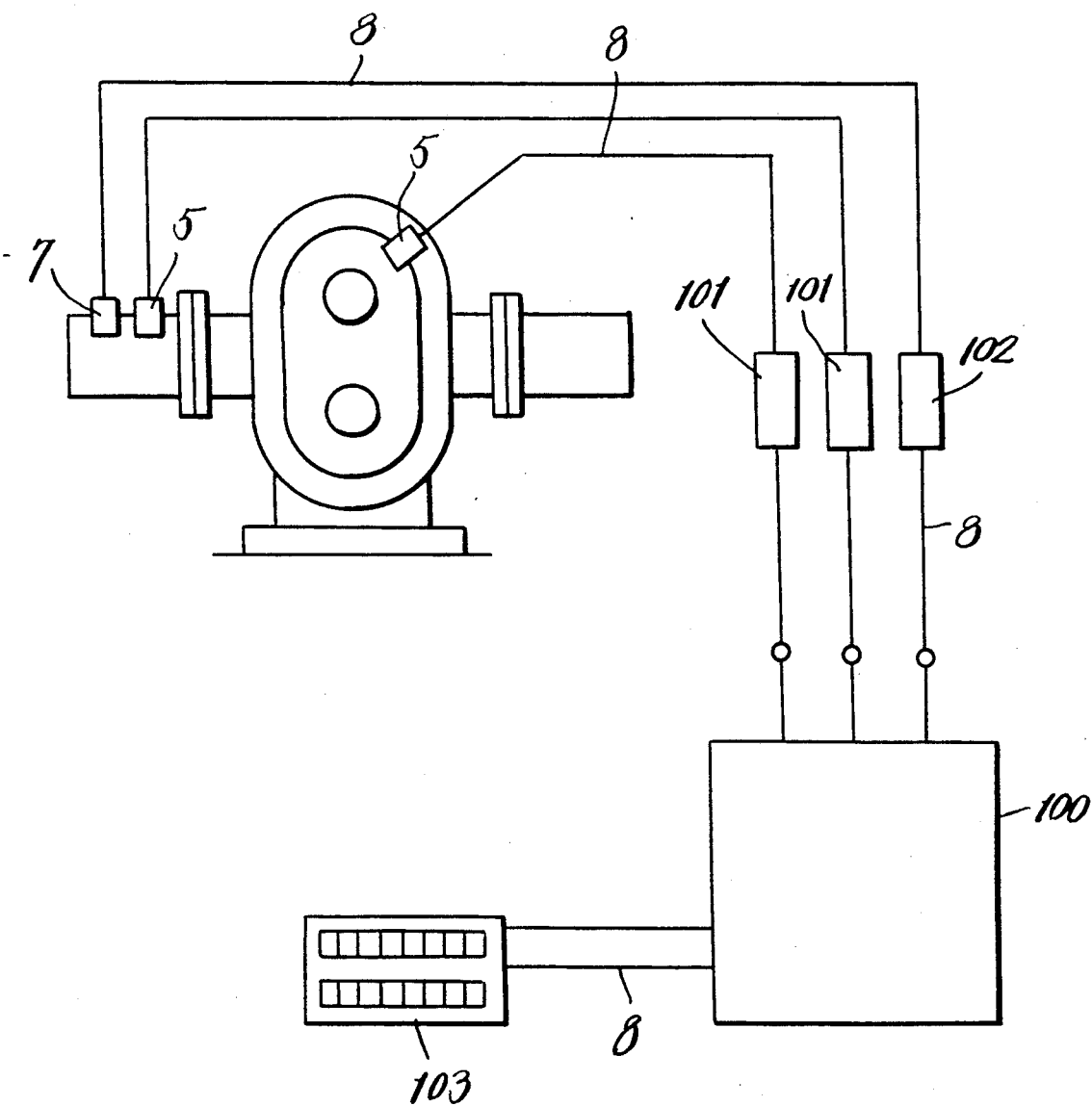
FIG. 5 is a diagrammatic illustration of an instrument having a built-in temperature sensor, and a computer equipped with ROM for instrumental error compensation.
Figure 6:
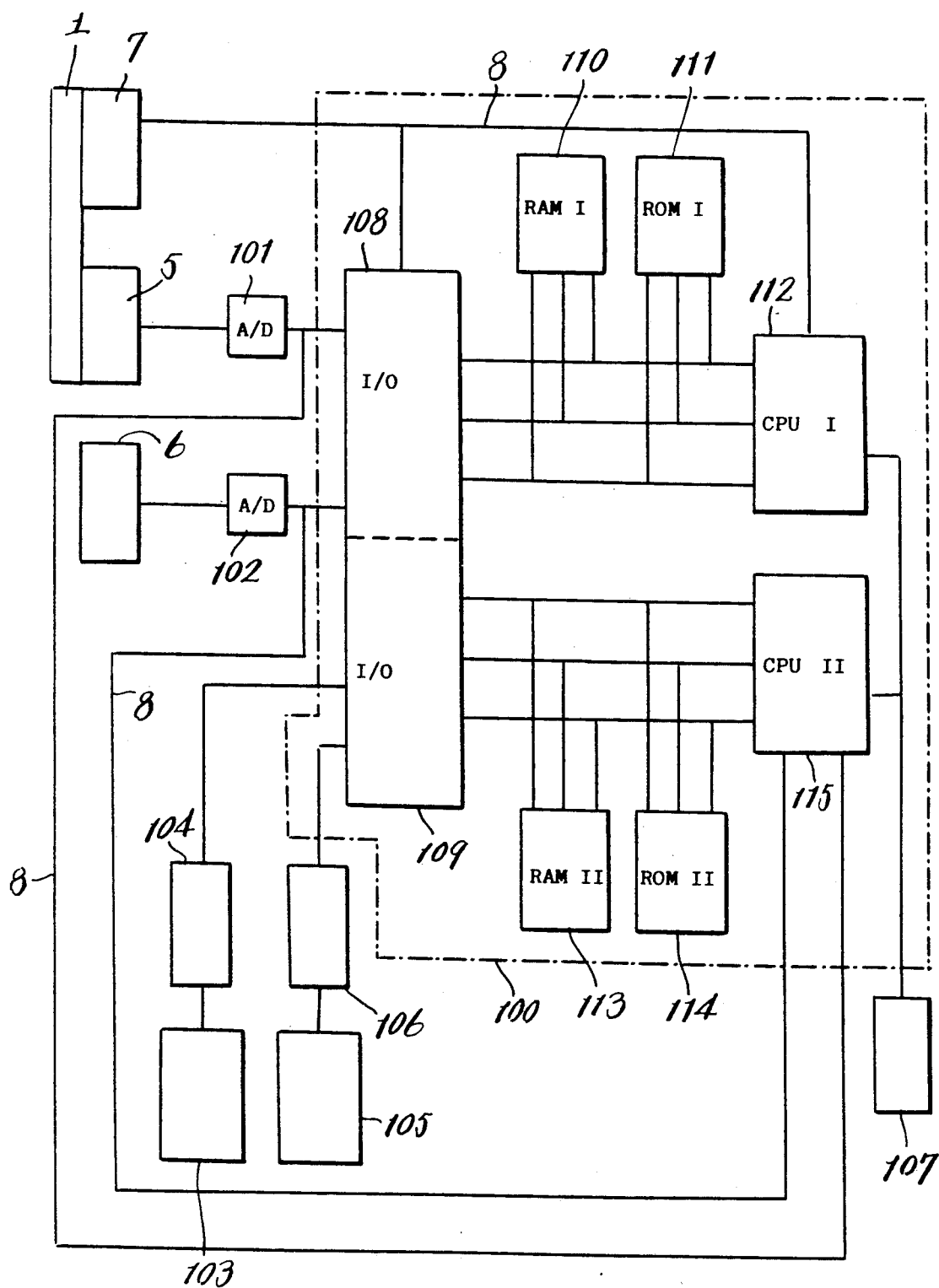
FIG. 6 is a schematic circuit diagram showing an instrumental error compensation system comprising CPU, I/O converter, ROM, RAM and other elements.

With reference to the embodiment shown in FIG. 5 and FIG. 6, the numeral denotes a displacement flowmeter and numeral 5 denotes a temperature sensor installed in the instrument chamber or in the piping directly connected thereto. Signals of temperature sensor 5 are transferred to the control unit 100 with a wire cable, or optical fiber cable 8, via A/D converter 101. The numeral 6 denotes a rotation detector sensor mounted on flow-meter 1 for detecting the rotation of the flowmeter. Signals transmitted from an arithmetic unit in the control unit 100 received by wire cable, or optical fiber cable 8' via A/D converter 102, actuate indicator 103 via line 8".

FIG. 6 is an illustration drawing of the internal circuitry of the control unit 100, and equipment connected thereto. The pulse signals from the temperature sensor 5 and rotation detector sensor 6 transmitting the rotation speed of the non-circular gear rotors in the flowmeter is input to the interface 108. Sensor 6 is inputted to the interruption terminal of the central control unit CPU(I) 112 and sensor 5 is inputted to the interruption terminal of central control unit CPU(II)115.

By this interruption, CPU(I) 112 confirms for calculation, by checking the input of input-output interface 108, 109 and then proceeds to calculation that the pulse input has been made. During the time between this pulse input and its preceding pulse input, or the pulse interval, the flow-rate per pulse is read from the compensation data corresponding volume coefficient of the liquids of the instrumental error previously stored in ROM(I) 111, and the temperature is read out that is obtained by converting the specific resistance of the temperature sensor 5 into a digital value by analog-digital converter 101. The random access memory RAM(I) 110 is used for the temporary storage of variables and calculations. The base flow rate may be calculated similarly with respect to an indication of time as provided by clock 107 which provides a highly accurate time base reference for the microprocessor system. By the temperature-specific gravity data previously stored in ROM(I) 111, the flow-rate per pulse is converted into the flow-rate at a reference temperature, for example, 20° C. The numeral 113 denotes a random access memory RAM (II) and the numeral 114 denotes a read only memory ROM (II). RAM (II) is used for the temporary storage of variables and calculations and ROM (II) stores temperature-viscosity data. This converted flow-rate is further fed-back to the input-output interface 108, 109 and delivers a signal to the interruption terminal of the central processing unit CPU II 115. Next the flow-rate per pulse of the pulses from the rotation sensor 6 is read out that is obtained by converting the specific resistance of the temperature sensor 5 from the instrumental error compensation data of which reference to the temperature-viscosity coefficients stored in ROM-(II) 114, and the compensation value is obtained from the temperature-viscosity data stored in ROM (II) given by converting the signal of the temperature sensor 5 installed in the flowmeter 1 with the A/D converter 101, and the above-mentioned flow-rate is converted into the flow-rate at the reference temperature. Then an accumulated flow or instantaneous flow-rate is indicated on the indicator 103 via the driver 104. Alternatively, the counter 105 is brought into action via driver 106. A circuit for compensating for an instrumental error of a flowmeter which generates a pulse signal having a frequency proportional to a flow rate comprises: pulse distributor means for generating two different pulse signal in response to the pulse signal output from the flowmeter, the two pulse signals having a predetermined frequency ratio to each other; flow rate calculator means for calculating an instantaneous flow-rate based on the frequency of the output signal of the flowmeter and generating an output signal indicative of the instantaneous flow rate; flow-rate compensation section identifies means for identifying, in response to the output signal of the flow rate calculator means, specific ones of predetermined flow-rate compensation sections to which the calculated instantaneous flow-rate belongs, and generating a signal indicative of the identified section; compensation constant selector means for storing in advance compensation constants for calculating an instrumental error of the flowmeter, selecting specific ones of the compensation constants in response to the output signal of the identifier means, and generating a signal indicative of the compensation constant.

A guaranteed accuracy of 0.05% means errors within half a thousandth of the indicated flow-rate, and therefore it is essential that the rotors, bearings, thrust bearings and other rotating parts for performing measurement functions of a displacement flowmeter of a mechanical construction are of a structure free from wear and deformations. For example, if the tooth profiles of a rotor for a non-circular gear flowmeter is made to be of a shape excluding liquid confinement phenomena and deformations on the meshing teeth surfaces, a precise flow-rate compensation effect can be exercised by the micro computer. Because of a mechanical construction, it is preferred that service conditions are not severe, and it is further important that the instrument used has a low rotational speed of the rotors within the flow-rate range of the measurements, and also a low rotational speed for smallest flow-rates. A light-weight rotor having the shape of a large discharge ratio (Ratio of discharge flow per one rotation to the displacement of rotation) can satisfy this requisite.

The conversion into a correct flow-rate is made by using the above-mentioned electronic compensation mechanism and the instrumental errors are compensated for indication. It is however essential that no deformations by mechanical wear in the rotors and bearings performing the measurement function of the instrument proper are produced. As deformations of these rotating elements vary the clearances of the flowmeter proper, and instrumental error curves accordingly vary, and conversion values for instrumental error compensation must be modified.

For this reason, a tooth profile such as cycloidal tooth form which excludes liquid confinement should be preferably used. Such gears are superior in durabilities because no scoring phenomenon is produced thereon. They are further smaller in rotational resistance and also superior in measurement functions.

A non-circular gear flowmeter has a high measurement accuracy because of its high volumetric efficiencies. The larger flatness rotors may have, the larger its discharge rate becomes, the smaller the instrument proper becomes, and the instrumental error characteristics are improved, which may be counted as advantages of the instrument. However, a pair of meshing gear rotors revolve with repeated accelerations and decelerations; and therefore vibrations and noises increase with higher rotational speeds, and internal leakages are caused because braking forces increase with higher rotational speeds, and consequently higher instrumental errors will result.

Figure 7:
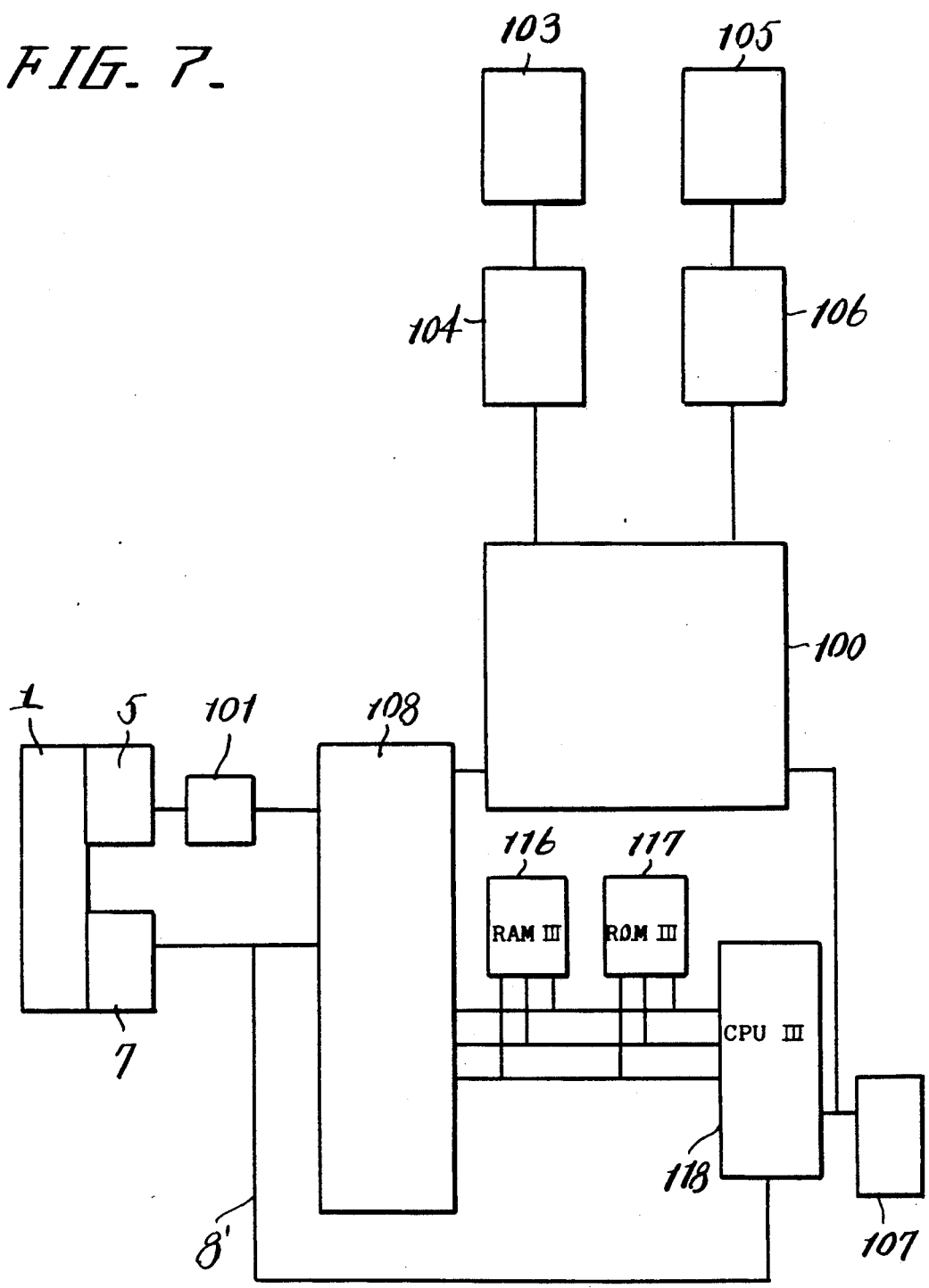
FIG. 7 is a schematic circuit diagram incorporating a control unit for input of magnetic sensor interruption and clock signal interruption for compensating characteristic curve errors to the ideal QE curve between a flowmeter with a built-in rotation magnetic sensors, and control units.

FIG. 7 shows a circuit diagram of another embodiment incorporated between a control unit and flowmeter with another control unit for input of interruption of a magnetic sensor to compensate for errors of a characteristic curve to ideal QE curve (flow rate vs. error curve) and for interruption of clock signals. FIG. 7 is an electrical circuit diagram to read out for compensation of the data to compensate characteristic errors of flowmeters to the ideal QE curve stored in ROM(III) 117 as well as to make instrumental error compensations based on the fluid volumetric changes and correlations of temperature-viscosity with the control unit illustrated in FIG. 6. RAM(III) 116 is provided in the circuit in the same position and for carrying out the function similar to RAM(II) 113 in the FIG. 6 embodiment. The pulse signals from the rotation detector sensor 6 for indicating the rotation of rotors in the flowmeter and from temperature sensor 5 are input to the input interface 108. Sensor 106 is also connected to the interruption terminal of central control unit CPU(III) 118. CPU(III) 118 confirms by this interruption that a pulse input has been made, by checking the input of the input-output interface 108; reads out the flow per one pulse using the time between this pulse and the preceding pulse from the compensation data on instrumental errors stored in ROM(III) 117 to make compensations for instrument-specific errors in each of the flow ranges; and calculates compensation values of instrumental errors due to volume, specific gravity and viscosity changes arising from the fluid temperature changes by using the control unit 100 illustrated in FIG. 6.

Figure 8:
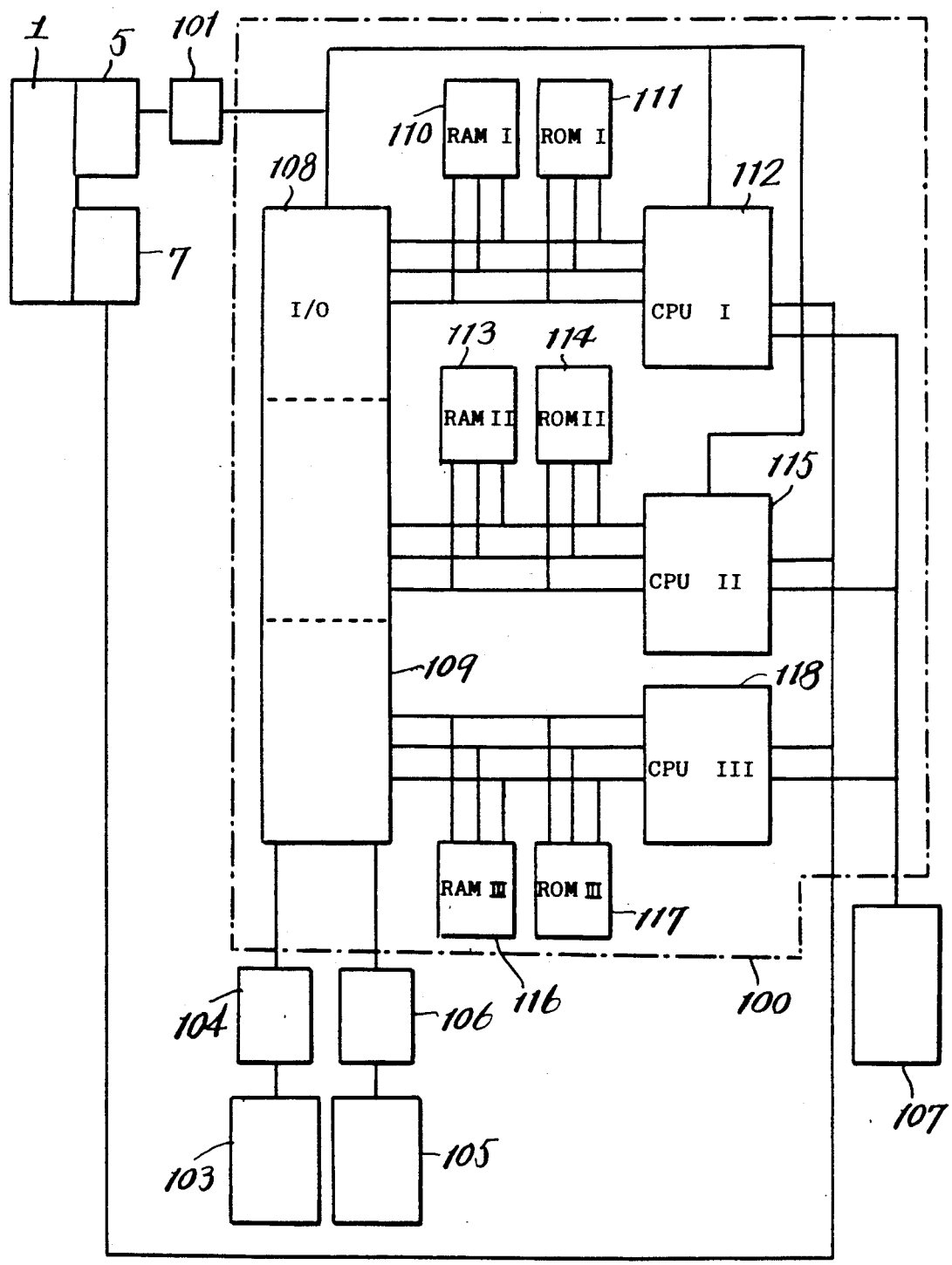
FIG. 8 is a schematic circuit diagram illustrating a compensation unit incorporated with circuits to compensate instrumental errors due to viscosity and specific gravity changes due to temperature changes of an instrument with built-in rotation magnetic sensors and temperature sensors.

FIG. 8 shows a circuit diagram of a control unit combining an electrical circuit incorporated with ROM(I) 111 and ROM(II) 114, for compensating instrumental error values due to volumetric changes and viscosity changes arising from the above-mentioned temperature changes, and an electrical circuit including ROM(III) 117 to compensate characteristic errors specific to the flowmeter; the unit has indication and transmission functions for compensation values of instantaneous instrumental errors.

The flow meter 1 is connected with the control unit 100 having micro-computers through the sensor 6 and encoder 102 so that the measured volumetric value is fed to the computer after conversion to a pulse signal. The pulse signal generator or encoder 102 is connected with a rotor of the flow meter 1 so that a magnet inserted on the side of the rotor is rotated in conjunction with the revolution of the rotor. The encoder 102 also has an electro-magnet detector cell so that a pulse signal is generated each time the pulse is generated. The computer unit 100 is also supplied with a signal from the temperature sensor 5 in connection with the temperature of the liquid flowing through a conduit after conversion into a digital signal. In the control unit 100, the volume coefficients for liquids each having a different specific gravity are memorized for the predetermined range of temperatures.

Upon receiving the signal of the temperature of the fluid flowing through the conduit the control unit 100 picks up a corresponding volume coefficient and prepares to conduct a calculation at every arrival of a signal from the pulse signal generator 6. Each time the control unit 100 makes a calculation to provide a corrected volume which is transmitted to the integrating indicator 103.

The clock 107 serves to give the necessary instructive pulse to the computer so that the central control unit (CPU 112) measures an occasional temperature of the fluid and provides a corresponding volume coefficient. The generation of subsequent instructive pulses every few seconds is sufficient in view of the time constant of the temperature sensor 5 and also because the temperature change of the fluid generally occurs gently.

The control unit 100 has an amplifier and an analog-digital (A-D) converter 102 so that the signal from the sensor 6 is fed to the computer through both elements.

FIGS. 24a and 24b show a process of drawing an approximate QE curve for insertion of data.

The following QE is drawn by the following equation:

$$Y = \frac{-1}{X^n}$$

FIG. 25 shows QE curves calculated in accordance with the invention. Measuring errors are compensated by compensation coefficients of temperature vs. specific gravity of the liquids tester on higher and lower temperature conditions (e.g. 31° C. and 14° C., respectively).

FIG. 26 shows one example of QE curves as compensated by this invention; measuring errors are compensated by compensation coefficients of temperature vs. specific gravity and temperature vs. viscosity of liquids on higher and lower temperature conditions. It is shown that the influence of temperature is mostly eliminated by the compensation affected by this apparatus.

FIG. 27 shows QE curves compensated by compensation coefficients of temperature vs. specific gravity of the liquids tested on higher and lower temperatures by another flowmeter.

FIG. 28 shows QE curves compensated by compensation coefficients of temperature vs. specific gravity and temperature vs. viscosity of the liquids on higher and lower temperature conditions as shown in FIG. 26.

The present invention aims especially at an improvement in accuracies of displacement type flowmeters, and, at the same time, at an enhancement in reliabilities thereof as an industrial instrument. That is, it is essential that the rotor or measurement sensor will not wear and has sufficient durabilities. Conventional displacement type flowmeters such as elliptic gear flowmeters, Roots type flowmeters and others demand high precision in the fabrications thereof, which results in high fabrication costs. Noncircular rotors, when measuring a subject fluid flowing at a constant speed in pipings, will rotate with uneven rotational speeds. Accordingly, rotors of light material will have similar rotation resistances, and achieve high accuracies. Furthermore, the measurement section comprising a casing, rotors and bearings requires high accuracies for composing members in fabrication and assembly, and also demands special assembly techniques. Compared to these, an outstanding effect can be obtained in cost-saving because fabrication costs will be greatly reduced if the gear rotors and shafts are made of an integral structure of synthetic resins and similar materials by a forming process therefore, and a casing proper or casing, cover and fixed shaft are formed to be an integral structure by a forming process. Application technique examples wherein the surface of the rotating shafts and bearings or the surfaces of elliptical gear rotors have applied thereon fine ceramics coatings or metal platings or other surface hardening processes are used are contemplated within the scope of the present invention. Rotors of lighter materials have smaller inertial resistances in accelerating or decelerating rotation speed and therefore provide a low sensible flow-rate, which is a great advantage. When a product fabricated by a forming process, such as a molding process for example, has a lower accuracy, its instrumental error-rotation speed correlation (QE) is inferior in its linearity. However, because the above-mentioned elliptic gears having a tooth form giving less liquid confinement have no deformation in the tooth form, they have good durability, and therefore the property shown by the QE curve with inferior linearity represents an ideal curve with small instrumental errors by using electronic compensation methods and the gears transmit high accuracy flow-rate values throughout a wide flow-rate range.

An explanation of the embodiments shown in FIGS. 9-23 follows:

FIG. 9-a shows an elevation of a synthetic resin flow-meter body. The body 1 has a joint (or flange) 2, and its cover 3 is fixed using a packing bolt 31. The numeral 5 denotes a temperature sensor to which a cable 8 is connected. Rotation sensor 6 is connected to a control unit by cable 8'. FIG. 9-b shows a side view of FIG. 9-a. FIG. 9-c is a sectional view along the line A—A in FIG. 9-a, and shows short fixed shafts 9 and 9' in the measurement chamber of the casing body 1 which are formed integral with the casing body. The cover 3 has similar short fixed shafts 9, 9' similarly formed integral with the cover. Rotors 4, 4' are mounted on the shafts. A magnet 71 is provided on the rotor 4'. A corresponding rotation detector sensor 6 is provided in the cover 3, and is connected via a cable or optical fiber 8' to the control unit. The numeral 32 denotes a knock pin. The bearings 42 for the rotors fit on the shafts 9, 9' and the rotors can rotate freely.

FIG. 9-d shows temperature sensor 5 mounted on the instrument body to measure the fluid temperature and is connected to the control unit via cable 8. FIG. 9-e shows a perspective view of an integrally formed instrument proper 1. The position of a short fixed shaft in the measurement chamber is shown. FIG. 9-f shows in perspective the manner wherein the short fixed shafts are formed integral to the cover 3. FIG. 9-g shows a side view of the cover 3, FIG. 9-h shows the inside of cover 3, and FIG. 9-i shows a perspective view of cover 3.

FIGS. 9j, k and l show views of another embodiment of a cover 3 provided with a packing section in the measurement chamber.

FIG. 10-a is a sectional view of a casing body 1 and a cover 3 having shaft or bearing holes 92. Short shafts 41, 41' on both ends formed integral with the rotors 4, 4' fit into the shaft holes or bearings 92.

FIG. 10-b shows a side view of the cover 3 provided with the bearings 2 in FIG. 10-a.

FIG. 10-c shows a side view of a cover 3 provided with coneshaped bearings 94 having spiral grooves.

FIG. 10-d shows a side view of a cover 3 provided with a packing section in the measurement chamber.

FIG. 10-e shows the inside of cover 3 of FIG. 10-b.

FIG. 10-f shows the inside of the cover of FIG. 10-d.

FIG. 11 shows a sectional view of an embodiment accommodating a combination of a casing comprising an integral formed body 1 provided with fixed shafts 9, 9' in the measurement chamber and rotors 4, 4' having bearings 42 and short shafts 41, respectively integral therewith.

FIG. 12 shows a sectional view of an embodiment wherein metal shafts or ceramic shafts 91 are fixed on the measurement chamber side of a casing body 1 and cover 3.

FIG. 13-a shows a sectional view of structure wherein long fixed shafts 9, 9' formed integral with a cover 3. The ends of the shafts 9 fit into engaging parts on the measurement chamber of a casing 1.

FIG. 13-b shows a side view of an embodiment wherein long shafts 9, 9' are formed integral with a cover 3. FIG. 13-c shows a side view of a cover 3 formed integral with long shafts with packing sections in the measurement chamber. FIG. 13-d shows a perspective view for FIG. 13-c. FIG. 13-e shows a perspective view of a cover 3 formed integral with long shafts and having a flange. FIG. 13-f is a perspective view of a cover 3 formed integral with long shafts and provided with packing sections. FIG. 13-g is a sectional view of a cover formed integral with a long shaft 9 and short shaft 9' having an open area for packing in the packing section of a casing body. FIG. 13-h shows in perspective the inside condition of a casing formed integral with long shafts 9, 9'.

FIG. 14-a shows in elevation a flowmeter with a indicator section, FIG. 14-b shows a side view thereof, FIG. 14-c a rear view thereof, and FIG. 14-d a sectional view taken along line C—C in FIG. 14-b. A location to be installed with a thermo sensor 7 is shown.

FIG. 14-e is a perspective view for showing the inside of a casing wherein short shafts 9, 9' are provided in the measurement chamber of a body 1.

FIG. 14-f is a perspective view for showing a casing formed integral with long fixed shafts 9, 9' which are secured in the measurement chamber of meter body 1. FIG. 14-g shows in elevation the cover 3 in FIG. 14-a to FIG. 14-e and FIG. 14-h shows the rear side of the cover of FIG. 14-g. FIG. 14-i shows a side view of the cover 3 of the embodiment shown in FIG. 14-a to FIG. 14-c and FIG. 14-e, and provided with conical short fixed shafts 93. FIG. 14-j shows a cover 3 formed integral with cylindrical short fixed shafts similar to the one in FIG. 14-i.

FIG. 14-k shows a cover 3 formed integral with long shafts 9, 9' of the embodiment shown in FIG. 14-a to FIG. 14-c. FIG. 14-l is a perspective view of the cover 3 in FIG. 14-j. FIG. 14-m is a perspective view of the cover 3 shown in FIG. 14-k. FIG. 14-n is an inside view of cover 3 provided with a packing section in the measurement chamber. FIG. 14-o is a side view of a cover 3 formed integral with conical short shafts 9, 9' shown in FIG. 14-n. FIG. 14-p is a side view of a cover 9 formed integral with cylindrical shafts 9, 9' similar to FIG. 14-o. FIG. 14-q shows the side of a cover formed integral with long shafts 9, 9' and packing sections in the measurement chamber shown in FIG. 14-a to FIG. 14-c. FIG. 14-r is a side view of a cover wherein conical short shafts 93 are formed integral with packing section in the measurement chamber. FIG. 14-s is a perspective view of the cover 3 shown in FIG. 14-q.

FIG. 15-a shows an embodiment of a flowmeter structured with divided casings 1 joined along surface 10. FIG. 15-b shows an elevation of the embodiment of FIG. 15-a and FIG. 15-c shows a view of the rear side.

Figure 16:
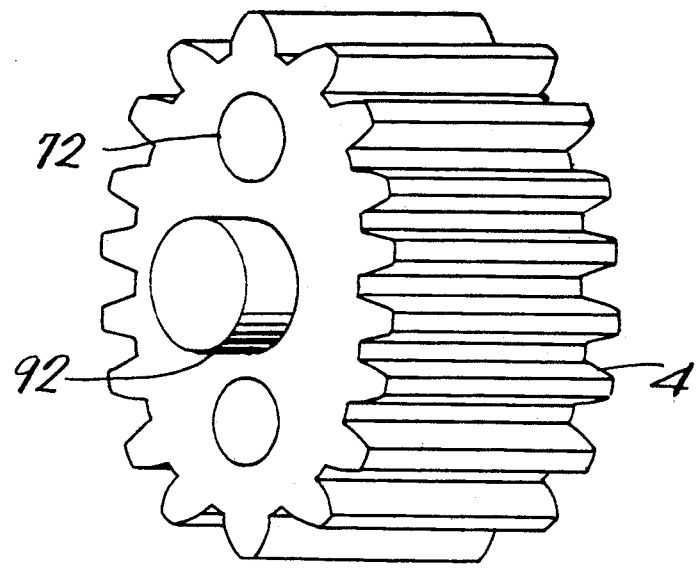
FIG. 16 is a perspective view of a synthetic resin gear formed to make integral a non-circular gear rotor and its shaft.

FIG. 16 shows elliptical gear rotor 4 having short shaft 92.

Figure 17:
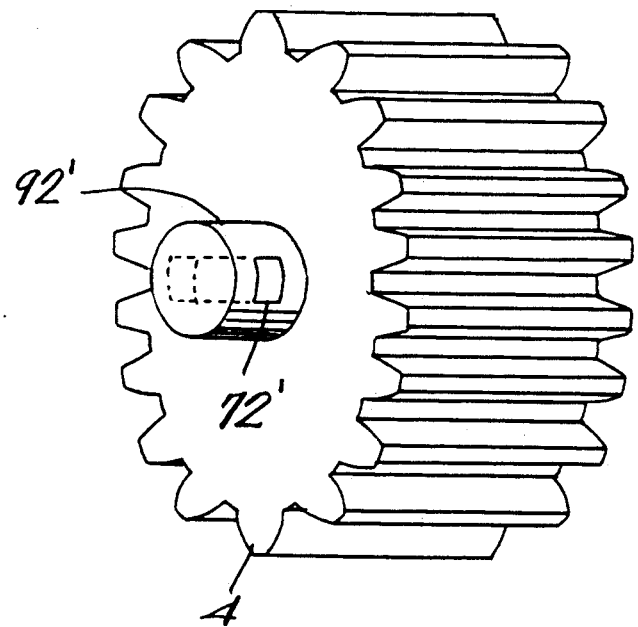
FIG. 17 is a perspective view of gear similar to FIG. 16 having a rotation detector member provided in the shaft.

FIG. 17 shows elliptic gear rotor 4 having short shaft 92' in which rotational sensor part 72' is mounted.

Figure 18:
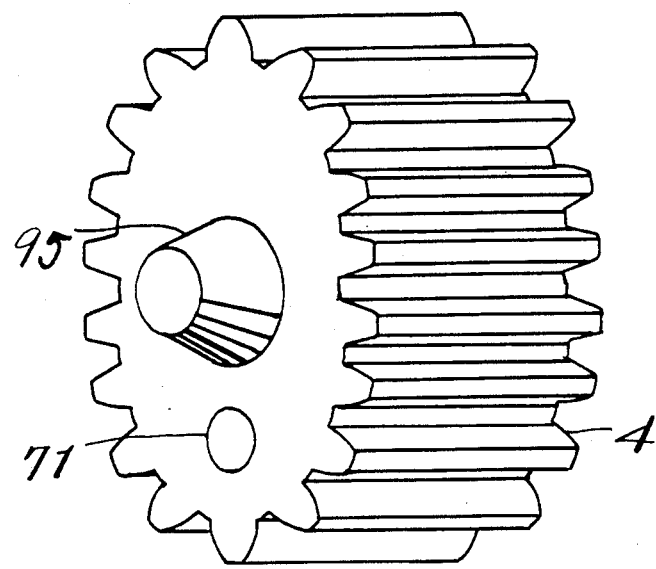
FIG. 18 is a perspective view of a non-circular gear rotor formed integral with a cone-shape shaft.

FIG. 18 shows a rotor provided with conical short integral shaft 95.

Figure 19:
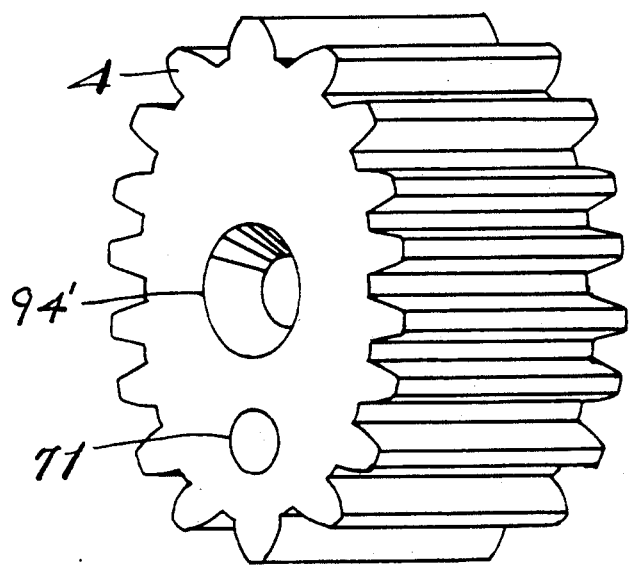
FIG. 19 is a perspective view of a non-circular gear rotor provided with a cone-shape bearing.

FIG. 19 shows a rotor having a cone-shaped bearing 94' similar to that of FIG. 10-c.

Figure 20:
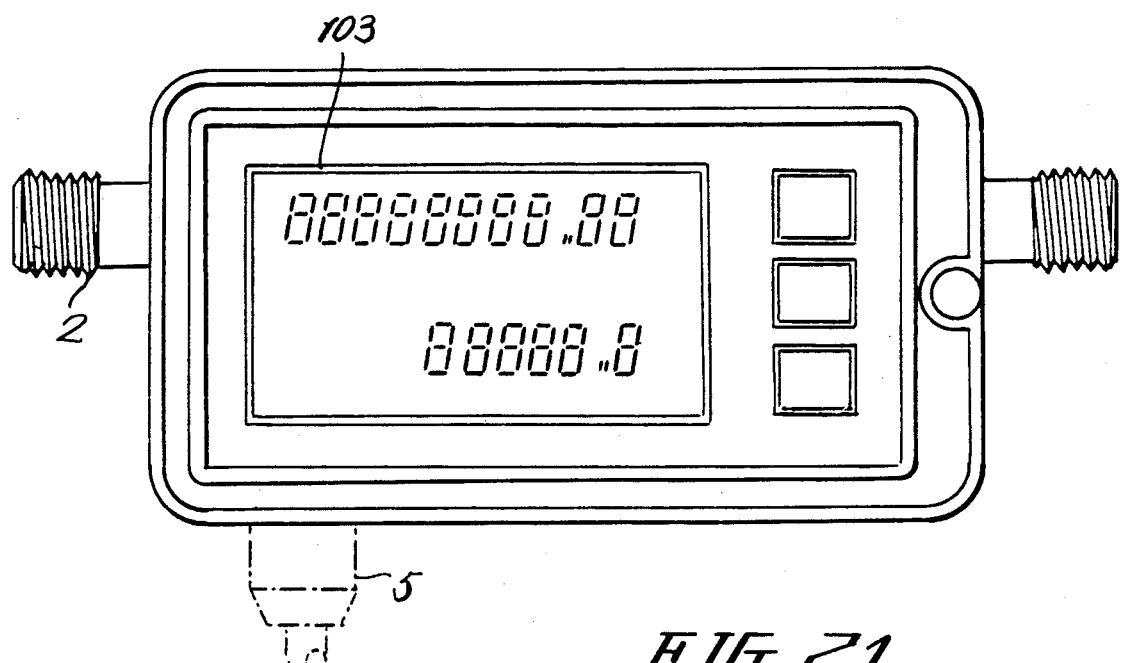
FIG. 20 is a front elevation of an embodiment whose indicator section has a built-in strainer.

FIG. 20 shows a flow meter with a indicator section 103.

Figure 21:
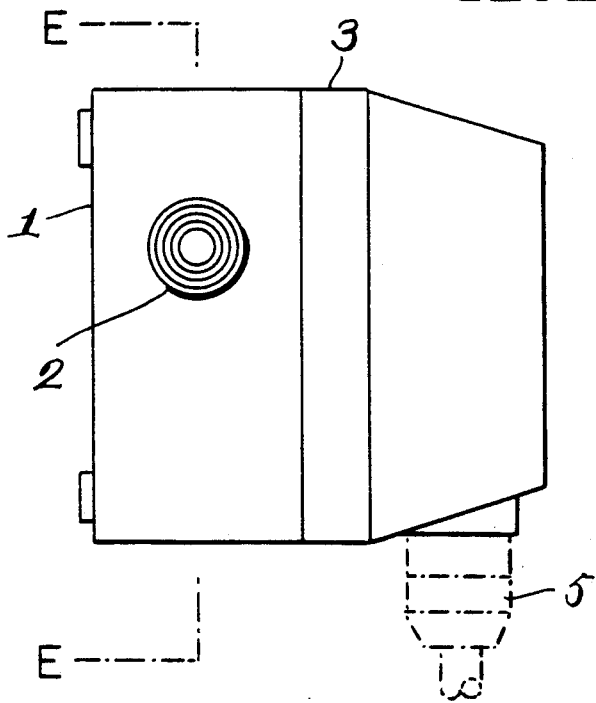
FIG. 21 is a side view of FIG. 20.

FIG. 21 is a side view of FIG. 20.

Figure 22:
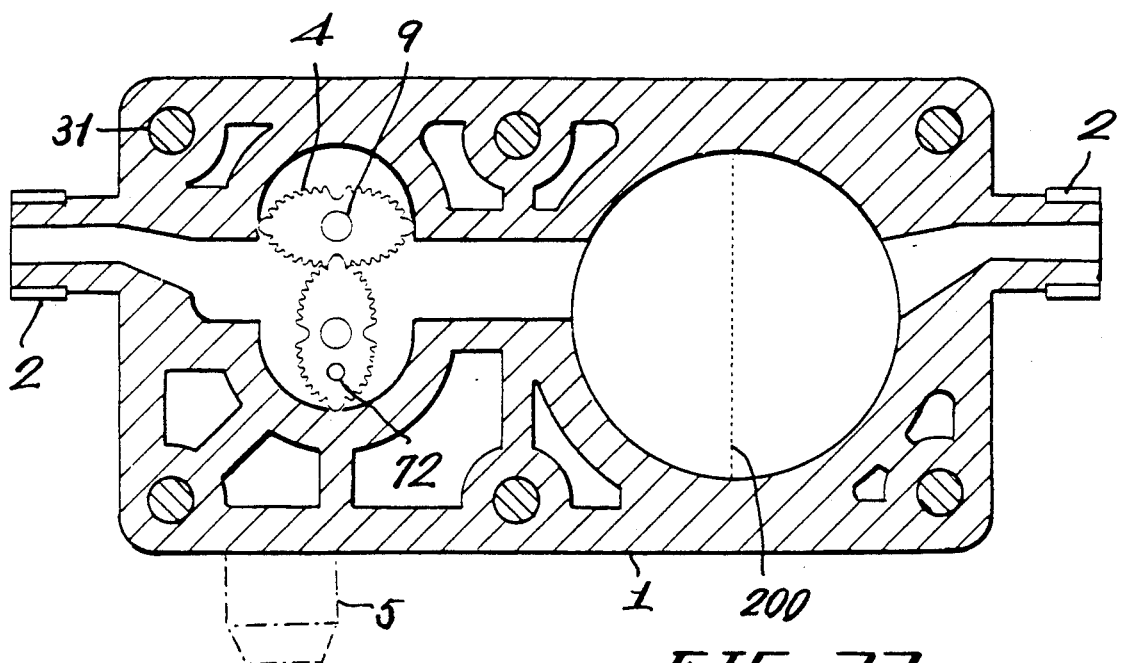
FIG. 22 is a cross-sectional view taken along line E—E in FIG. 21.

FIG. 22 shows a section of FIG. 21 wherein 200 is a strainer position.

Figure 23:
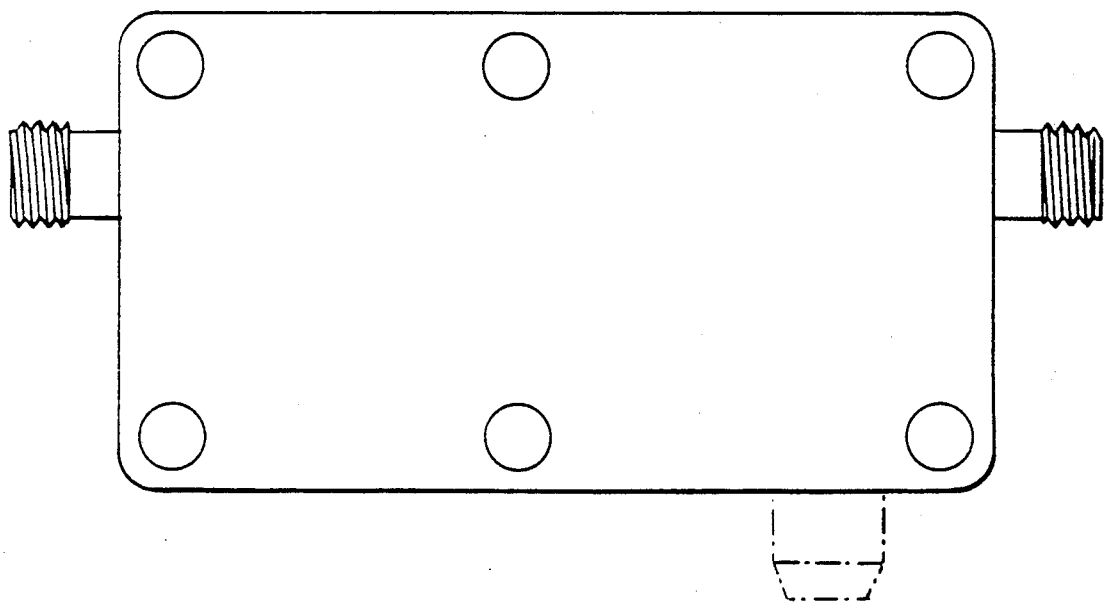
FIG. 23 is a rear side view of FIG. 20.

FIG. 23 is a rear view of the embodiment of FIG. 20.

The present invention has a super precision measurement function for accumulated flow or instantaneous flow-rate in a wide flow-rate range for conditions having only micro-temperature changes as well as for conditions having large temperature changes, by providing micro computers for indicating the measurements and instantaneously compensating for errors of flow-rate caused by viscosity changes in response to temperature changes of a subject fluid in order to enhance the accuracy of the flow-rate indicated by an elliptical gear flowmeter having accepted reliabilities. However, this invention is not limited to the above-cited displacement type flowmeters, but any electronic arithmetic mechanisms for compensation in other types of flowmeters which compensate the effect of viscosity changes caused by temperature changes to exert changes on instrumental errors are within the invention.

I claim:

1. An instrumental error compensation apparatus for a fluid flow measuring instrument comprising:

a positive displacement flowmeter having a rotor means and inlet and outlet means for measuring the flow rate of fluid flowing therethrough;

temperature sensor means mounted on said flowmeter for measuring the temperature of the fluid flowing through the flowmeter and producing an electrical signal representing the measured temperature;

rotation sensor means mounted on said flowmeter for measuring the rotational speed of said rotor means and producing an electrical pulse signal representing the measured speed;

microprocessor control unit means for receiving said electrical signals from said temperature and rotation sensor means; and electric signal conducting means operatively connecting said temperature and rotation sensor means to said control unit means for conducting said signals from said sensors to said control unit means;

said microprocessor control unit means comprising,
means for correlating the viscosity of the fluid as a function of the measured temperature with the instrumental error and storing the correlated temperature-viscosity data, means for determining the period of pulse signals transmitted for each rotation of said rotor means, and calculating a compensation value from instrumental error compensation data based on the correlated temperature-viscosity data stored in the microprocessor means, means for calculating a first flow rate from said signal representing rotor speed and modifying said first flow rate by said compensation value to produce a second flow rate, and means to output and indicate said second modified flow rate on real time.

2. An instrumental error compensation apparatus as claimed in claim 1 wherein said microprocessor control unit further comprises:

and ROM(II) for storing the temperature-viscosity data.

3. An instrumental error compensation apparatus as claimed in claim 1 wherein said microprocessor control unit further comprises:

an ROM II for storing the instrumental error compensation data and compensating for instrumental error values due to volumetric and viscosity changes corresponding to temperature changes.

4. An instrumental error compensation apparatus as claimed in claim 1 wherein said microprocessor control unit further comprises:

an ROM III for storing an ideal QE curve; and an electrical circuit for compensating characteristic errors specific to the flowmeter to the ideal QE curve stored in the ROM III, making instrumental error compensations based on fluid volumetric changes and correlations of temperature-viscosity, and feeding such instrumental errors to a computer.

* * * * *